US011999167B2

(12) United States Patent
Nakagawa et al.

(10) Patent No.: US 11,999,167 B2
(45) **Date of Patent: *Jun. 4, 2024**

(54) INKJET PRINTING APPARATUS AND RECOVERY METHOD

(71) Applicant: CANON KABUSHIKI KAISHA, Tokyo (JP)

(72) Inventors: Yoshinori Nakagawa, Kawasaki (JP); Takatoshi Nakano, Yokohama (JP); Atsushi Takahashi, Tama (JP); Takuya Fukasawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/193,036

(22) Filed: Mar. 30, 2023

(65) Prior Publication Data

US 2023/0234361 A1 Jul. 27, 2023

Related U.S. Application Data

(63) Continuation of application No. 17/398,886, filed on Aug. 10, 2021, now Pat. No. 11,642,889, which is a (Continued)

(30) Foreign Application Priority Data

Oct. 5, 2018 (JP) ................................ 2018-189855

(51) Int. Cl.
*B41J 2/165* (2006.01)

(52) U.S. Cl.
CPC ....... *B41J 2/16523* (2013.01); *B41J 2/16532* (2013.01)

(58) Field of Classification Search
CPC .... B41J 2/175; B41J 2/16544; B41J 2/16585; B41J 2/16523; B41J 2/16532;
(Continued)

(56) References Cited

U.S. PATENT DOCUMENTS 6,984,009 B2 1/2006 Nakagawa et al. ............... 347/9
6,994,416 B2 2/2006 Seki et al. ...................... 347/19
(Continued)

FOREIGN PATENT DOCUMENTS

CN 108128037 6/2018
CN 108454242 8/2018
(Continued)

OTHER PUBLICATIONS

Office Action dated May 26, 2021 in counterpart Chinese Application No. 201910930987.X, together with English translation thereof.
(Continued)

*Primary Examiner* — Thinh H Nguyen
(74) *Attorney, Agent, or Firm* — Venable LLP

(57) ABSTRACT

Provided are an inkjet printing apparatus and a recovery method capable of suppressing ink thickening in the ejection openings in the suction process for the ejection openings. A vacuum wiper is moved being in contact with the ejection opening surface of the print head to perform a vacuum wiping process for the arrayed ejection openings sequentially. Ink is circulated in flow paths including the flow paths communicating with the ejection openings for which the vacuum wiping process has been finished.

57 Claims, 14 Drawing Sheets

Related U.S. Application Data continuation of application No. 16/567,338, filed on Sep. 11, 2019, now Pat. No. 11,117,377.

(58) Field of Classification Search
CPC ...... B41J 2/1721; B41J 2/17509; B41J 29/02; B41J 29/17; B41J 2/18; B41J 2/16535; B41J 2/16517; B41J 2/16505; B41J 2/17513; B41J 2002/1655
See application file for complete search history.

(56) References Cited

U.S. PATENT DOCUMENTS

| | | | | |
|---|---|---|---|---|
| 7,144,096 | B2 | 12/2006 | Seki et al. | 347/30 |
| 7,396,095 | B2 | 7/2008 | Nakagawa et al. | 347/9 |
| 8,752,930 | B2 | 6/2014 | Doi et al. | 347/17 |
| 8,827,419 | B2 | 9/2014 | Nakagawa et al. | 347/30 |
| 8,944,562 | B2 | 2/2015 | Nakagawa et al. | 347/30 |
| 9,096,065 | B2 | 8/2015 | Nakano et al. | B41J 2/16532 |
| 9,387,679 | B2 | 7/2016 | Shiiba et al. | B41J 2/16538 |
| 9,446,595 | B2 | 9/2016 | Takarabe et al. | B41J 2/1652 |
| 9,517,628 | B2 | 12/2016 | Tenkawa et al. | B41J 2/17566 |
| 10,207,506 | B2 | 2/2019 | Iwasaki et al. | B41J 2/16508 |
| 10,265,951 | B2 | 4/2019 | Nakano et al. | B41J 2/0456 |
| 10,286,657 | B2 | 5/2019 | Kameshima et al. | B41J 2/04563 |
| 10,434,773 | B2 | 10/2019 | Sameshima | B41J 2/1623 |
| 10,442,191 | B2 | 10/2019 | Takahashi et al. | B41J 2/04586 |
| 10,493,762 | B2 | 12/2019 | Sato et al. | B41J 2/16505 |
| 11,642,889 | B2 * | 5/2023 | Nakagawa | B41J 2/16517 347/30 |
| 2005/0052513 | A1 | 3/2005 | Inoue | 347/89 |
| 2009/0237424 | A1 | 9/2009 | Martin et al. | 347/6 |
| 2014/0132664 | A1 | 5/2014 | Igawa et al. | 347/30 |
| 2016/0271943 | A1 | 9/2016 | Tobita | B41J 2/1652 |
| 2018/0029377 | A1 | 2/2018 | Tanaka et al. | B41J 2/145 |
| 2018/0154630 | A1 | 6/2018 | Takahashi et al. | B41J 2/04553 |
| 2018/0236797 | A1 | 8/2018 | Ohashi et al. | B41J 2/16585 |
| 2019/0001670 | A1 | 1/2019 | Fukasawa et al. | B41J 2/18 |
| 2019/0009522 | A1 | 1/2019 | Fukasawa et al. | B41J 2/16535 |
| 2019/0009590 | A1 | 1/2019 | Fukasawa et al. | B41J 2/16532 |
| 2019/0030893 | A1 | 1/2019 | Sameshima | B41J 2/1629 |
| 2020/0108610 | A1 | 4/2020 | Kiuchi et al. | B41J 2/16538 |
| 2020/0108626 | A1 | 4/2020 | Fukasawa et al. | B41J 2/0451 |

FOREIGN PATENT DOCUMENTS

| | | |
|---|---|---|
| CN | 108602347 | 9/2018 |
| JP | H05-201028 | 8/1993 |
| JP | 2016-175264 | 10/2016 |
| JP | 2017-144634 | 8/2017 |
| JP | 2018-016046 | 2/2018 |
| JP | 2018-130960 | 8/2018 |

OTHER PUBLICATIONS

Office Action dated Sep. 6, 2022 in counterpart Japanese Application No. 2018-189855, together with English translation thereof.
Office Action dated Mar. 8, 2023 in counterpart Chinese Application No. 202210861457.6, together with English translation thereof.
Office Action dated Mar. 5, 2024 in counterpart Japanese Application No. 2022-209209, together with English translation thereof.

* cited by examiner

INKJET PRINTING APPARATUS AND RECOVERY METHOD

This application is a continuation of application Ser. No. 17/398,886 filed Aug. 10, 2021, currently pending, which was a continuation of application Ser. No. 16/567,338 filed Sep. 11, 2019, now issued as U.S. Pat. No. 11,117,377 on Sep. 14, 2021; and claims priority under 35 U.S.C. § 119 to Japan Application JP 2018-189855 filed in Japan on Oct. 5, 2018; and the contents of all of which are incorporated herein by reference as if set forth in full.

BACKGROUND OF THE INVENTION

Field of the Invention

The present invention relates to inkjet printing apparatuses that eject ink onto print media to perform printing and recovery methods for keeping favorable the condition of ink ejection from a print head which ejects ink and also for recovering it.

Description of the Related Art

Japanese Patent Laid-Open No. H5-201028 discloses a technique related to a recovery process for maintaining and recovering the ink ejection performance of the ejection openings that eject ink, in which a vacuum nozzle is set to face the ejection openings, and ink is forcibly sucked from the ejection openings by suction of the vacuum nozzle. In this technique disclosed in Japanese Patent Laid-Open No. H5-201028, a vacuum nozzle capable of performing suction for one to several ejection openings moves from one end portion toward the other end portion of an ejection opening row composed of arrayed multiple ejection openings, and thus performs suction for all the ejection openings.

Meanwhile, the ink inside the ejection openings subjected to the process is kept exposed to the atmosphere until the recovery process for the ejection openings is finished. Here, for example, in the case where the number of ejection openings for the recovery process is large or the case where the ejection opening row is long, it takes a long time for the recovery process, accordingly increasing the time for which the ink inside the ejection openings subjected to the process earlier is exposed to the atmosphere. Thus, there is a possibility that the ink inside these ejection openings thickens, and that enough ejection performance cannot be kept despite the recovery process.

SUMMARY OF THE INVENTION

The present invention provides an inkjet printing apparatus and a recovery method that prevent the ejection performance of the ejection openings recovered by the recovery process for the ejection openings from being impaired.

In the first aspect of the present invention, there is provided an inkjet printing apparatus including:

a print head that includes arrayed multiple ejection openings configured to eject ink and multiple flow paths respectively communicating with the ejection openings, and is configured to print an image on a print medium according to print data;

a suction unit configured to perform a suction process by moving, relative to the print head, at a position facing an ejection opening surface of the print head, on which the ejection openings are formed, and sucking ink from the ejection openings in order;

a circulation unit configured to circulate ink supplied to the print head, through the flow paths; and a control unit configured to control the suction process by the suction unit and ink circulation by the circulation unit, wherein during the suction process, the control unit circulates ink in at least the flow paths communicating with the ejection openings for which the suction by the suction unit has been finished while the suction unit sucks ink from the ejection openings for which the suction by the suction unit has not been finished.

In the second aspect of the present invention, there is provided an inkjet printing apparatus including:

a print head that includes arrayed multiple ejection openings configured to eject ink and is configured to print an image according to print data, a suction unit configured to perform a suction process by moving, relative to the print head, at a position facing an ejection opening surface of the print head, on which the ejection openings are formed, and sucking ink from the ejection openings in order; and a control unit configured to control ink ejection by the print head and the suction process by the suction unit, wherein during the suction process, the control unit performs preliminary ejection, which is ink ejection not contributing to image printing, from at least the ejection openings for which the suction by the suction unit has been finished while the suction unit sucks ink from the ejection openings for which the suction by the suction unit has not been finished.

In the third aspect of the present invention, there is provided a recovery method including;

moving a suction unit relative to a print head, the print head including arrayed multiple ejection openings configured to eject ink according to print data, at a position facing an ejection opening surface of the print head, on which the ejection openings are formed; and sucking ink from the ejection openings in order with the suction unit while moving the suction unit relative to the print head, wherein during the suction for the ejection openings with the suction unit, ink is circulated at least in the flow path communicating with the ejection openings for which the suction with the suction unit has been finished while the suction unit sucks ink from the ejection openings for which the suction by the suction unit has not been finished.

In the fourth aspect of the present invention, there is provided a recovery method including;

moving a suction unit relative to a print head, the print head including arrayed multiple ejection openings and configured to eject ink according to print data, at a position facing an ejection opening surface of the print head, on which the ejection openings are formed; and sucking ink from the ejection openings in order with the suction unit while moving the suction unit relative to the print head, wherein during the suction for the ejection openings with the suction unit, preliminary ejection, which is ink ejection not contributing to image printing, is performed from at least the ejection openings for which the suction by the suction unit has been finished while the suction unit sucks ink from the ejection openings for which the suction by the suction unit has not been finished.

The present invention makes it possible to prevent the ejection performance of the ejection openings recovered by the recovery process for the ejection openings from being impaired.

Further features of the present invention will become apparent from the following description of exemplary embodiments with reference to the attached drawings.

DESCRIPTION OF THE EMBODIMENTS

First Embodiment

Hereinafter, an embodiment of the present invention will be described in detail with reference to the drawings. The following embodiment is not intended to limit the present invention, and all the combinations of the features described in the present embodiment are not necessarily essential for the solutions provided by the present invention. Note that the relative positions, shapes, and the like of the constituents described in the embodiment are mere examples, and hence they are not intended to limit the scope of the invention only to those examples.

Figure 1:
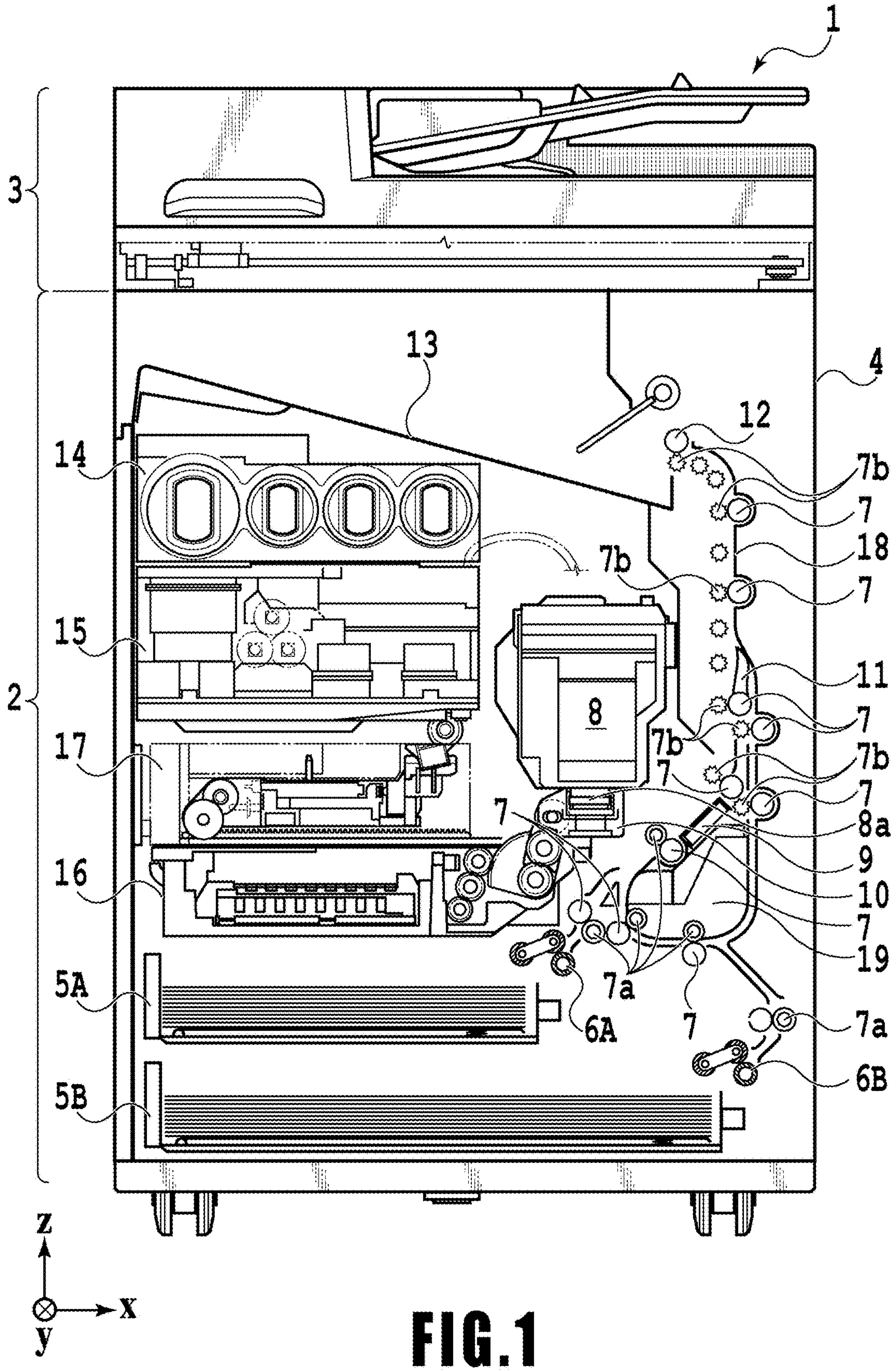
FIG. 1 is a view of a printing apparatus in a standby state.

FIG. 1 is a view of the internal configuration of an inkjet printing apparatus 1 (hereinafter, the printing apparatus 1) used in this embodiment. In FIG. 1, an x direction represents a horizontal direction, a y direction (direction normal to the sheet surface) represents a direction in which ejection ports are aligned in a later-described print head 8, and a z direction represents the vertical direction.

The printing apparatus 1 is a multifunction printer including a print unit 2 and a scanner unit 3. The printing apparatus 1 can use the print unit 2 and the scanner unit 3 separately or in synchronization to perform various processes related to print operation and scan operation. The scanner unit 3 includes an automatic document feeder (ADF) and a flatbed scanner (FBS) and is capable of scanning a document automatically fed by the ADF as well as scanning a document placed by a user on a document plate of the FBS. The present embodiment is directed to the multifunction printer including both the print unit 2 and the scanner unit 3, but the scanner unit 3 may be omitted. FIG. 1 shows the printing apparatus 1 in a standby state in which neither print operation nor scan operation is performed.

A first cassette 5A and a second cassette 5B that house print media (cut sheets) S are mounted in an attachable and detachable manner at a bottom portion of the print section 2 on the lower side of a housing 4 in the vertical direction. The first cassette 5A houses relatively small print media of up to a size of A4 in the form of a flat pile. The second cassette 5B houses relatively large print media of a size of up to A3 in the form of a flat pile. Near the first cassette 5A, a first feed unit 6A is provided which separately feeds the housed print media. Likewise, a second feed unit 6B is provided near the second cassette 5B. When a print operation is performed, a print medium S is fed selectively from one of the cassettes.

Conveying rollers 7, a discharge roller 12, pinch rollers 7*a*, spurs 7*b*, a guide 18, an inner guide 19, and a flapper 11 are conveying mechanisms that guide print media S in predetermined directions. The conveying rollers 7 are drive rollers disposed upstream and downstream of the print head 8 and driven by a conveying motor not illustrated. The pinch rollers 7*a* are driven rollers that rotate while nipping a print medium S with the conveying rollers 7. The discharge roller 12 is a drive roller disposed downstream of the conveying rollers 7 and driven by a conveying motor not illustrated. The spurs 7*b* convey a print medium S while holding it between themselves and the conveying rollers 7 disposed downstream of the print head 8 and the discharge roller 12.

The guide 18 is provided along a conveying path for print media S and guides a print medium S in predetermined directions. The inner guide 19 is a member extending in the y direction and having a curved side surface and guides a print medium S along this side surface. The flapper 11 is a member that switches the direction of conveyance of a print medium S in a double-sided print operation. A discharge tray 13 is a tray on which to place and hold print media S discharged by the discharge roller 12 after completing their print operations.

The print head 8 of in the embodiment is a full-line color inkjet print head, in which the ejection openings that eject ink according to print data are arrayed along the y-direction of FIG. 1 by the length corresponding to a width of print media S. Specifically, the print head 8 is configured to be capable of ejecting multiple colored inks. In the state in which the print head 8 is at a standby position, an ejection opening surface 8*a* of the print head 8 faces vertically downward and is capped with a cap unit 10 as illustrated in FIG. 1. In print operation, the orientation of the print head 8 is changed by a print controller 202 described later such that the ejection opening surface 8*a* faces a platen 9. The platen 9, composed of a flat plate extending in the y-direction, supports a print medium S from its back surface while the print head 8 is performing print operation on the print medium S. The movement of the print head 8 from the standby position to a printing position will be described later in detail.

An ink tank unit 14 stores inks of four colors to be supplied to the print head 8. An ink supply unit 15 is provided at a point along a flow channel connecting the ink tank unit 14 and the print head 8 and adjusts the pressure and flow rate of the inks inside the print head 8 within appropriate ranges. This embodiment employs a circulatory ink feed system. The ink supply unit 15 adjusts the pressure of the inks to be supplied to the print head 8 and the flow rate of the inks collected from the print head 8 within appropriate ranges.

A maintenance unit 16 includes the cap unit 10 and a wiping unit 17 and operates them with a predetermined timing to perform a maintenance operation on the print head 8. The maintenance operation will be described later in detail.

Figure 2:
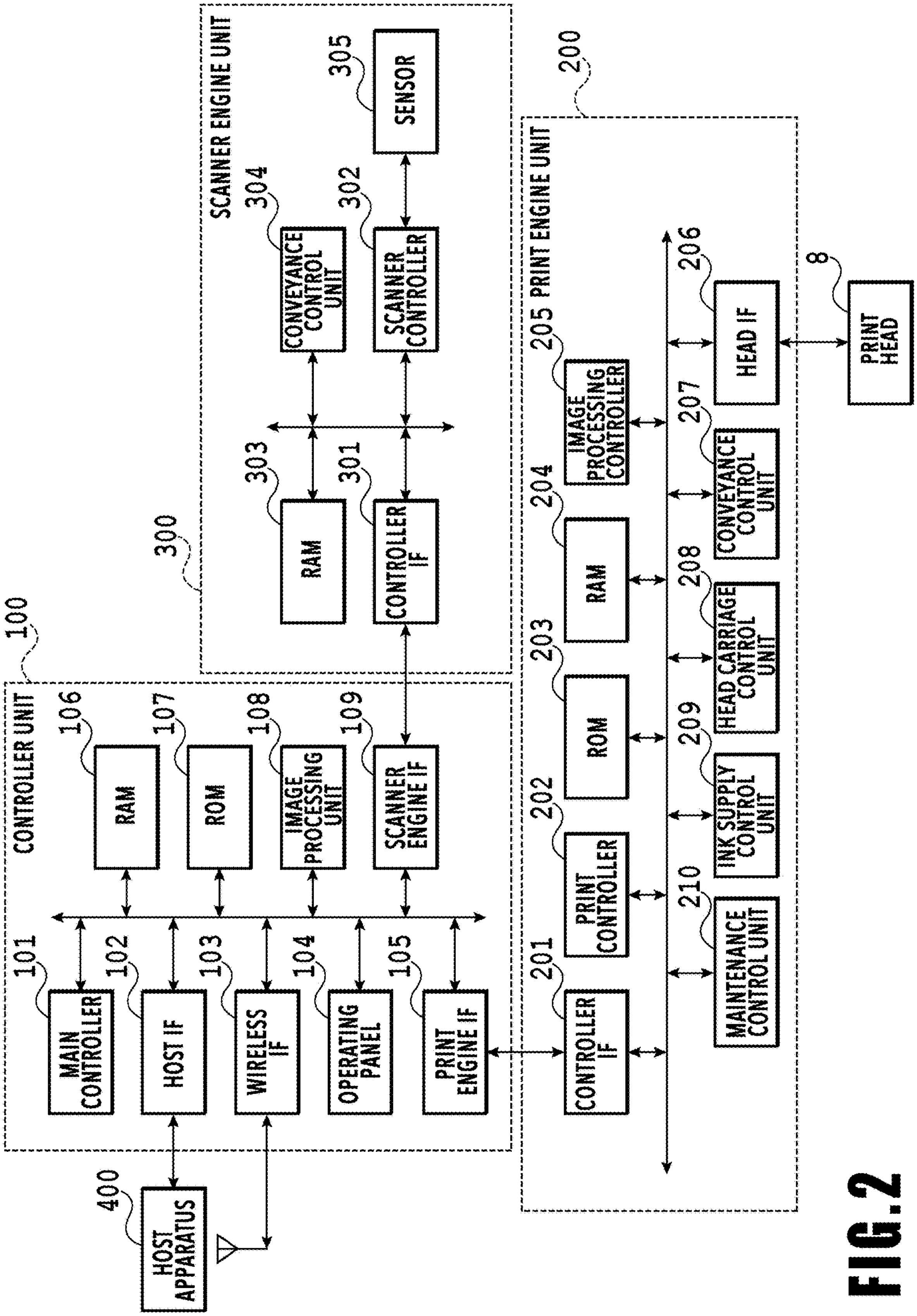
FIG. 2 is a diagram of a control configuration of the printing apparatus.

FIG. 2 is a block diagram illustrating a control configuration in the printing apparatus 1. The control configuration mainly includes a print engine unit 200 that controls the print section 2, a scanner engine unit 300 that controls the scanner section 3, and a controller unit 100 that controls the whole printing apparatus 1. The print controller 202 controls various mechanisms of the print engine unit 200 in accordance with instructions from a main controller 101 of the controller unit 100. Various mechanisms of the scanner engine unit 300 are controlled by the main controller 101 of the controller unit 100. Details of the control configuration will be described below.

In the controller unit 100, the main controller 101, configured of a CPU, controls the entire printing apparatus 1 by using an RAM 106 as a work area in accordance with programs and various parameters stored in an ROM 107. For example, upon input of a print job from a host apparatus 400 through a host I/F 102 or a wireless I/F 103, an image processing unit 108 performs predetermined image processing on received image data in accordance with an instruction from the main controller 101. The main controller 101 then transmits the image data after the image processing to the print engine unit 200 through a print engine I/F 105.

Meanwhile, the printing apparatus 1 may obtain image data from the host apparatus 400 by means of wireless communication or wired communication or from an external storage device (such as a USB memory) connected to the printing apparatus 1. The communication method used for the wireless communication or the wired communication is not particularly limited. For example, Wireless Fidelity (Wi-Fi) (registered trademark) or Bluetooth (registered trademark) can be employed as the communication method used for the wireless communication. Also, universal serial bus (USB) or the like can be employed as the communication method used for the wired communication. Further, for example, upon input of a read command from the host apparatus 400, the main controller 101 transmits this command to the scanner section 3 through a scanner engine I/F 109.

An operating panel 104 is a mechanism with which the user inputs and receives information into and from the printing apparatus 1. Through the operating panel 104, the user can instruct the controller unit 100 to perform operations such as photocopying and scanning, set a print mode, check information on the printing apparatus 1, and so on.

In the print engine unit 200, the print controller 202, configured of a CPU, controls various mechanisms of the print section 2 by using an RAM 204 as a work area in accordance with programs and various parameters stored in an ROM 203. Upon receipt of various commands and image data through a controller I/F 201, the print controller 202 temporarily stores them in an RAM 204. The print controller 202 causes an image processing controller 205 to convert the stored image data into print data so that the print head 8 can use the stored image data in a print operation. After the print data is generated, the print controller 202 causes the print head 8 to perform a print operation based on the print data through a head I/F 206. In doing so, the print controller 202 conveys a print medium S by driving the feed unit 6A or 6B, the conveying rollers 7, the discharge roller 12, and the flapper 11, which are illustrated in FIG. 1, through a conveyance control unit 207. A print process is performed by performing a print operation with the print head 8 in combination with the operation of conveying the print medium S in accordance with instructions from the print controller 202.

A head carriage control unit 208 changes the orientation and position of the print head 8 in accordance with the operation state of the printing apparatus 1 such as a maintenance state or a print state. An ink supply control unit 209 controls the ink supply unit 15 such that the pressure of the inks to be supplied to the print head 8 fall within an appropriate range. A maintenance control unit 210 controls the operation of the cap unit 10 and the wiping unit 17 of the maintenance unit 16 when a maintenance operation is performed on the print head 8.

For the scanner engine unit 300, the main controller 101 controls hardware resources in a scanner controller 302 by using the RAM 106 as a work area in accordance with programs and various parameters stored in the ROM 107. As a result, various mechanisms of the scanner section 3 are controlled. For example, the main controller 101 controls hardware resources in the scanner controller 302 through a controller I/F 301 such that a document loaded on the ADF by the user is conveyed through a conveyance control unit 304 and read by a sensor 305. Then, the scanner controller 302 stores the read image data in an RAM 303. Meanwhile, by converting the image data thus obtained into print data, the print controller 202 can cause the print head 8 to perform a print operation based on the image data read by the scanner controller 302.

Figure 3:
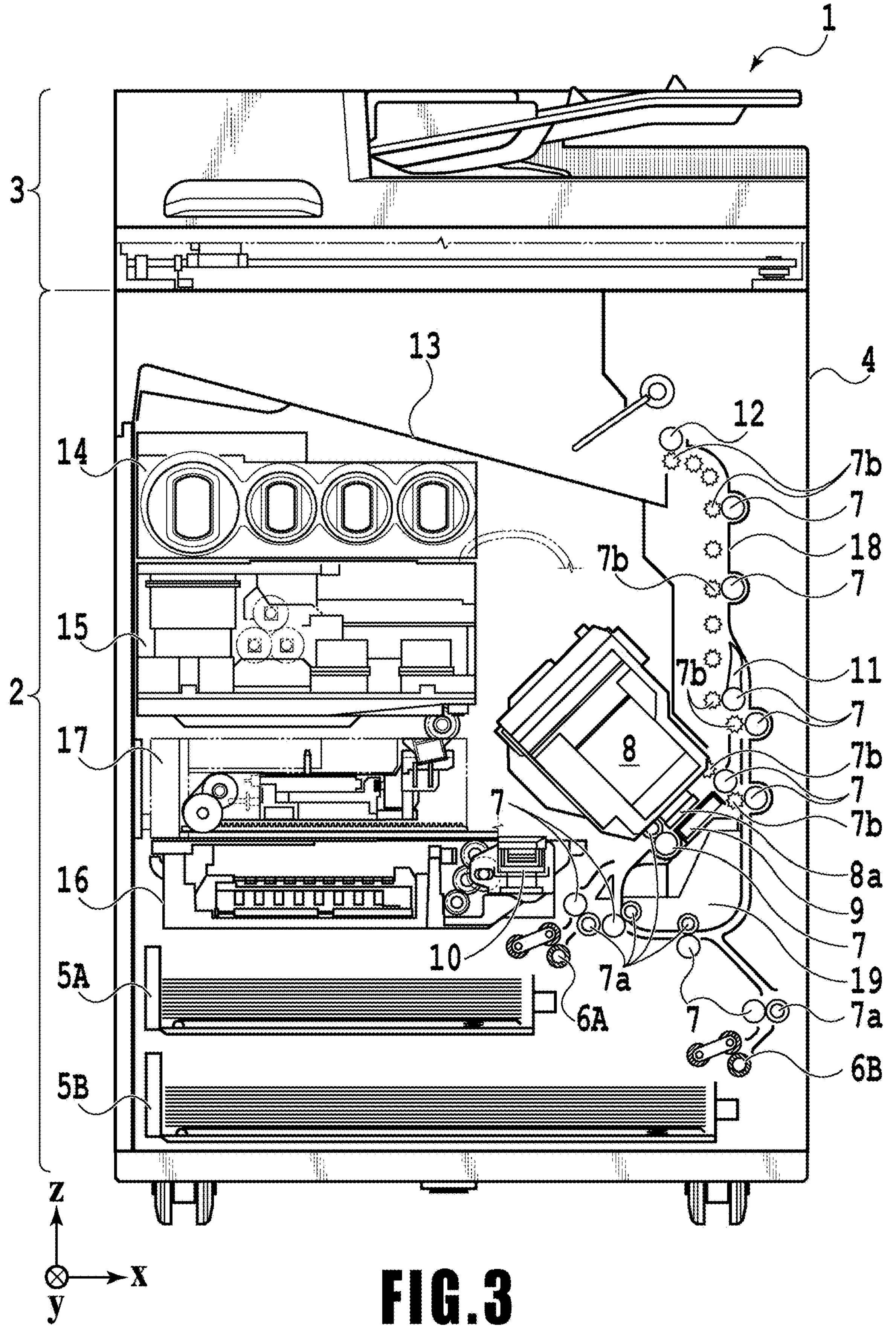
FIG. 3 is a view of the printing apparatus in a print state.

FIG. 3 illustrates the printing apparatus 1 in a print state. In contrast to the standby state illustrated in FIG. 1, the cap unit 10 is separated from the ejection opening surface 8*a* of the print head 8, and the ejection opening surface 8*a* is facing the platen 9. In this embodiment, the plane of the platen 9 is tilted at approximate 45 degrees with respect to the horizontal direction, and the ejection opening surface 8*a* of the print head 8 at the print position is also tilted at approximately 45 degrees with respect to the horizontal direction so that the distance between the ejection opening surface 8*a* and the platen 9 can be kept at a fixed distance.

When the print head 8 is moved from the standby position illustrated in FIG. 1 to the print position illustrated in FIG. 3, the print controller 202 lowers the cap unit 10 to a retreat position illustrated in FIG. 3 by using the maintenance control unit 210. As a result, the ejection opening surface 8*a* of the print head 8 is separated from a cap member 10*a*. Then, using the head carriage control unit 208, the print controller 202 turns the print head 8 by 45 degrees while adjusting its height level in the vertical direction, to thereby make the ejection opening surface 8*a* face the platen 9. The print controller 202 performs the reverse of the above steps when moving the print head 8 from the print position to the standby position after a print operation is completed.

Next, the maintenance operation on the print head 8 will be described. As also described with reference to FIG. 1, the maintenance unit 16 in this embodiment includes the cap unit 10 and the wiping unit 17 and operates them with a predetermined timing to perform the maintenance operation.

Figure 4:
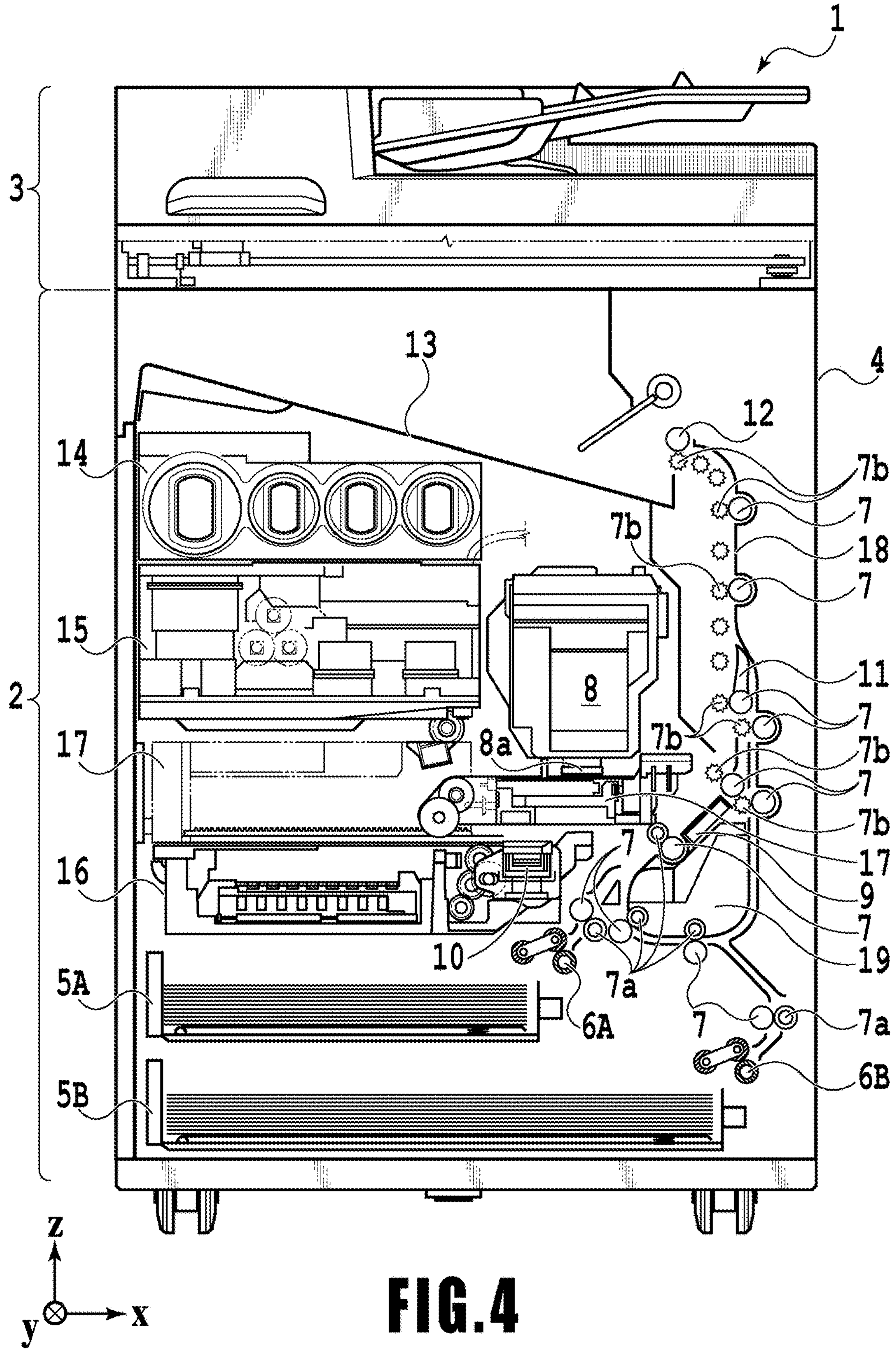
FIG. 4 is a view of the printing apparatus in a maintenance state.

FIG. 4 is a view of the printing apparatus 1 in the maintenance state. To move the print head 8 from the standby position illustrated in FIG. 1 to a maintenance position illustrated in FIG. 4, the print controller 202 moves the print head 8 upward in the vertical direction and moves the cap unit 10 downward in the vertical direction. The print controller 202 then moves the wiping unit 17 in the rightward direction in FIG. 4 from its retreat position. The print controller 202 thereafter moves the print head 8 downward in the vertical direction to thereby move it to the maintenance position, at which the maintenance operation can be performed.

Also, to move the print head 8 from the print position illustrated in FIG. 3 to the maintenance position illustrated in FIG. 4, the print controller 202 moves the print head 8 upward in the vertical direction while turning it by 45 degrees. The print controller 202 then moves the wiping unit 17 in the rightward direction from its retreat position. The print controller 202 thereafter moves the print head 8 downward in the vertical direction to thereby move it to the maintenance position, at which the maintenance operation by the maintenance unit 16 can be performed.

Figure 5A:
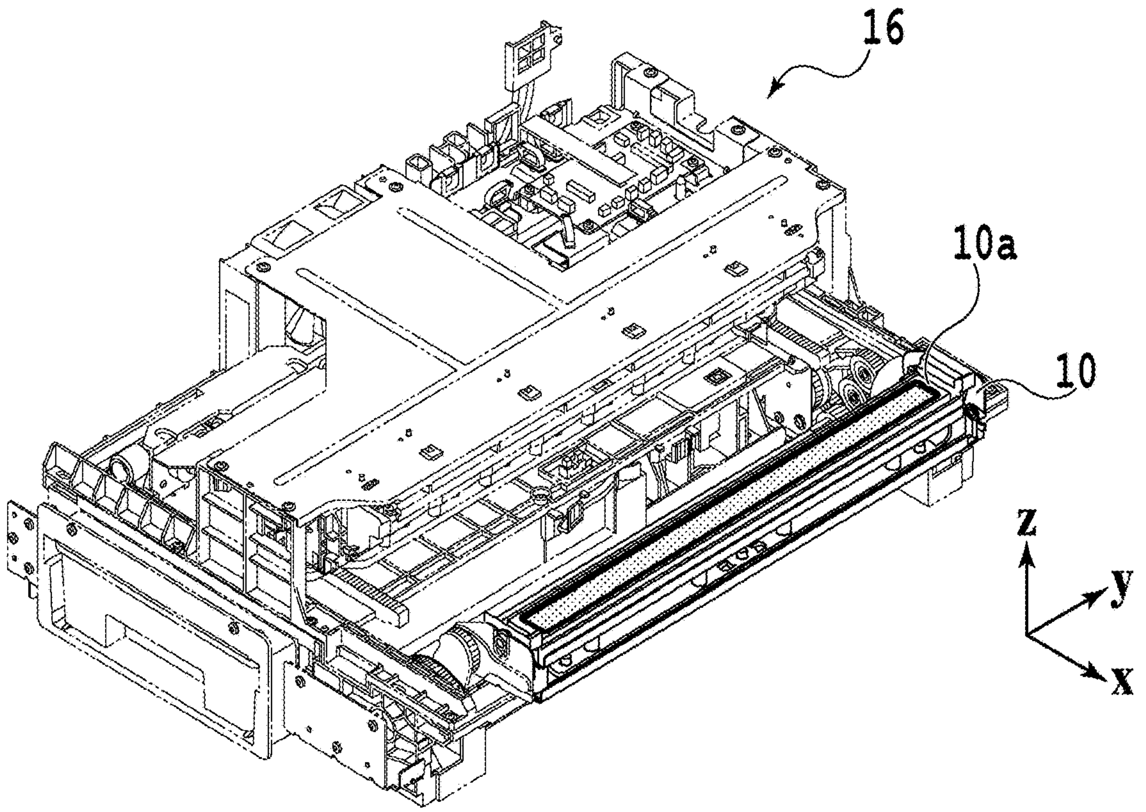
FIG. 5A and FIG. 5B are perspective views illustrating the configuration of a maintenance unit.
Figure 5B:
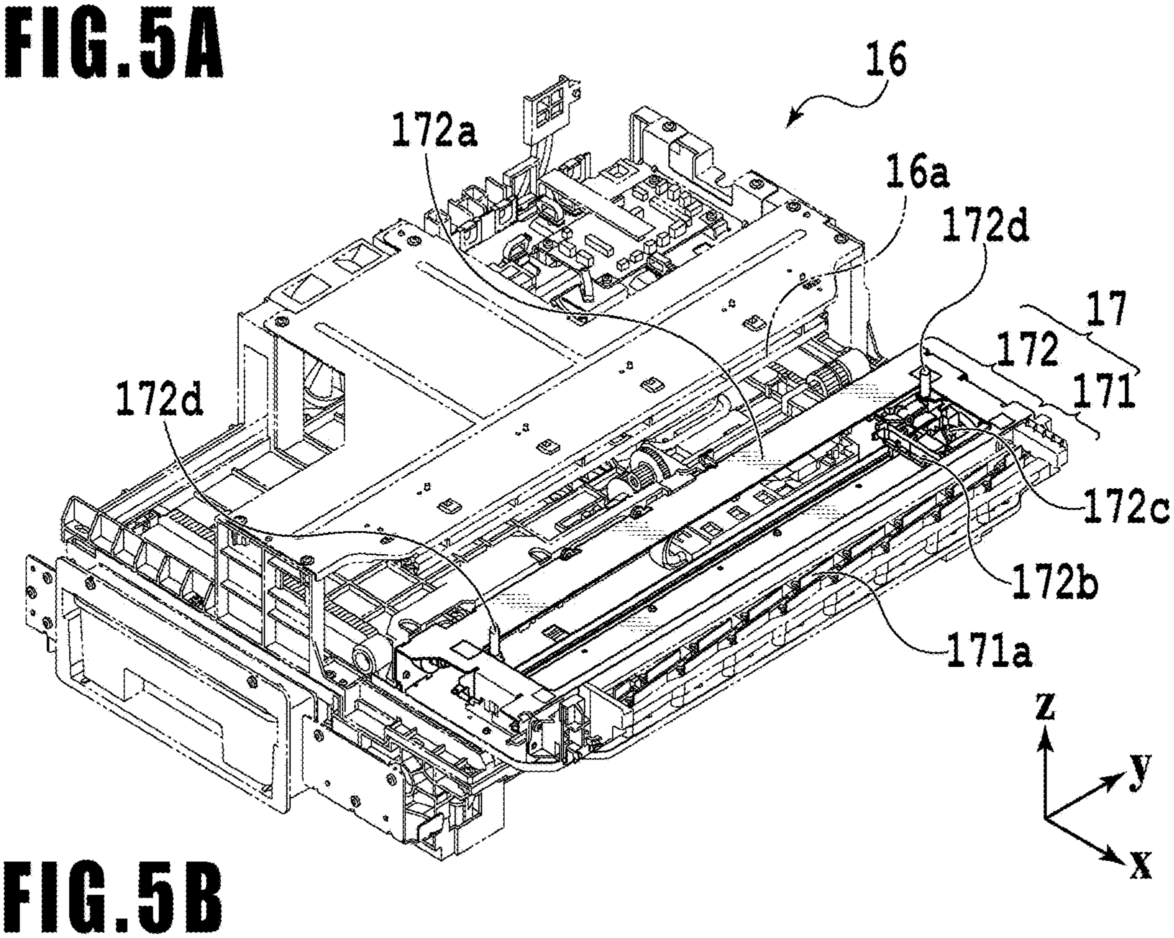

FIG. 5A is a perspective view illustrating the maintenance unit 16 at its standby position. FIG. 5B is a perspective view illustrating the maintenance unit 16 at its maintenance position. FIG. 5A corresponds to FIG. 1, and FIG. 5B corresponds to FIG. 4. When the print head 8 is at its standby position, the maintenance unit 16 is at its standby position illustrated in FIG. 5A and therefore the cap unit 10 is moved upward in the vertical direction and the wiping unit 17 is housed in the maintenance unit 16. The cap unit 10 has the box-shaped cap member 10*a* extending in the y-direction, which is brought into close contact with the ejection opening surface 8*a* of the print head 8 to prevent the evaporation of liquid in ink from the ejection openings. The cap unit 10 also has a function of collecting the inks ejected onto the cap member 10*a* for preliminary ejection or the like and sucking the collected inks with a suction pump not illustrated.

On the other hand, at the maintenance position illustrated in FIG. 5B, the cap unit 10 is moved downward in the vertical direction and the wiping unit 17 is pulled out of the maintenance unit 16. The wiping unit 17 includes two wiper units, namely a blade wiper unit 171 and a vacuum wiper unit 172.

In the blade wiper unit 171, blade wipers 171*a* that wipe the ejection opening surface 8*a* in the x direction are disposed along the y direction over a length corresponding to the region along which the ejection ports are aligned. To perform a wiping operation using the blade wiper unit 171, the wiping unit 17 moves the blade wiper unit 171 in the x direction with the print head 8 positioned at such a height level that the print head 8 can contact the blade wipers 171*a*. With this movement, the blade wipers 171*a* wipe the inks and the like attached to the ejection opening surface 8*a*.

At the inlet of the maintenance unit 16 through which the blade wipers 171*a* are housed, a wet wiper cleaner 16*a* is disposed which removes the inks attached to the blade wipers 171*a* and applies a wetting liquid to the blade wipers 171*a*. Each time the blade wipers 171*a* are housed into the maintenance unit 16, the matters attached to the blade wipers 171*a* are removed and the wetting liquid is applied thereto by the wet wiper cleaner 16*a*. Then, the next time the blade wipers 171*a* wipe the ejection opening surface 8*a*, the wetting liquid is transferred onto the ejection opening surface 8*a*, thereby improving the lubricity between the ejection opening surface 8*a* and the blade wipers 171*a*.

On the other hand, the vacuum wiper unit 172 includes a flat plate 172*a* with an opening portion extending in the y direction, a carriage 172*b* capable of moving in the y direction within the opening portion, and a vacuum wiper 172*c* mounted on the carriage 172*b*. The vacuum wiper 172*c* is disposed so as to be capable of wiping the ejection opening surface 8*a* in the y direction with movement of the carriage 172*b*. At the tip of the vacuum wiper 172*c*, a suction port is formed which is connected to a suction pump 32 (see FIG. 8). Thus, by moving the carriage 172*b* in the y direction with the suction pump 32 actuated, the inks and the like attached to the ejection opening surface 8*a* of the print head 8 are wiped by the vacuum wiper 172*c* and sucked into the suction port. In this operation, the flat plate 172*a* and positioning pins 172*d* provided at opposite ends of its opening portion are used to position the ejection opening surface 8*a* relative to the vacuum wiper 172*c*.

In this embodiment, it is possible to perform a first wiping process in which the wiping operation by the blade wiper unit 171 is performed but the wiping operation by the vacuum wiper unit 172 is not performed and a second wiping process in which both wiping processes are sequentially performed. To perform the first wiping process, the print controller 202 first pulls the wiping unit 17 out of the maintenance unit 16 with the print head 8 retreated to above the maintenance position in FIG. 4 in the vertical direction. The print controller 202 then moves the print head 8 downward in the vertical direction to such a position that the print head 8 can contact the blade wipers 171*a*, and thereafter moves the wiping unit 17 to the inside of the maintenance unit 16. With this movement, the blade wipers 171*a* wipe the inks and the like attached to the ejection opening surface 8*a*. Specifically, the blade wipers 171*a* wipe the ejection opening surface 8*a* as they are moved from the position to which the wiping unit 17 has been pulled out of the maintenance unit 16 to the inside of the maintenance unit 16.

After housing the blade wiper unit 171, the print controller 202 moves the cap unit 10 upward in the vertical direction to thereby bring the cap member 10*a* into tight contact with the ejection opening surface 8*a* of the print head 8. The print controller 202 then drives the print head 8 in this state to cause it to perform preliminary ejection, and sucks the inks collected in the cap member 10*a* with the suction pump.

On the other hand, to perform the second wiping process, the print controller 202 first slides the wiping unit 17 to pull it out of the maintenance unit 16 with the print head 8 retreated to above the maintenance position in FIG. 4 in the vertical direction. The print controller 202 then moves the print head 8 downward in the vertical direction to such a position that the print head 8 can contact the blade wipers 171*a*, and thereafter moves the wiping unit 17 to the inside of the maintenance unit 16. As a result, the wiping operation by the blade wipers 171*a* is performed on the ejection opening surface 8*a*. Subsequently, the print controller 202 slides the wiping unit 17 to pull it out of the maintenance unit 16 to a predetermined position with the print head 8 retreated to above the maintenance position in FIG. 4 in the vertical direction again. The print controller 202 then positions the ejection opening surface 8*a* and the vacuum wiper unit 172 relative to each other by using the flat plate 172*a* and the positioning pins 172*d* while lowering the print head 8 to the maintenance position illustrated in FIG. 4. The print controller 202 thereafter performs the above-described wiping operation by the vacuum wiper unit 172. The print controller 202 retreats the print head 8 upward in the vertical direction and houses the wiping unit 17, and then performs preliminary ejection into the cap member and the operation of sucking the collected inks with the cap unit 10, as in the first wiping process.

Hereinafter, wiping operation using the vacuum wiper unit 172 is referred to as vacuum wiping. In addition, a series of operations for performing vacuum wiping, specifically, the operations from the one for making the print head 8 retreat vertically upward from the maintenance position again until wiping operation by the vacuum wiper unit 172 is finished, are referred to as a vacuum wiping process.

Here, the vacuum wiping process is a process of wiping the ejection opening surface 8*a* while negative pressure is being applied to the ejection opening surface 8*a*. In the vacuum wiping process, the negative pressure applied to the ejection opening surface 8*a* and the time during which the negative pressure is applied can be adjusted. Thus, vacuum wiping has better performance in removing ink from the ejection opening surface 8*a* and accordingly provides a larger cleaning effect than the wiping operation using the blade wiper 171*a*. Accordingly, vacuum wiping is capable or removing ink attached and solidified and ink thickened at the ejection opening surface 8*a* more reliably than the wiping operation using the blade wiper 171*a*. Hence, with the second wiping process including execution of vacuum wiping in addition to the wiping operation using the blade wiper 171*a*, ink attached and solidified and ink thickened at the ejection opening surface 8*a* can be removed more reliably.

Figure 6:
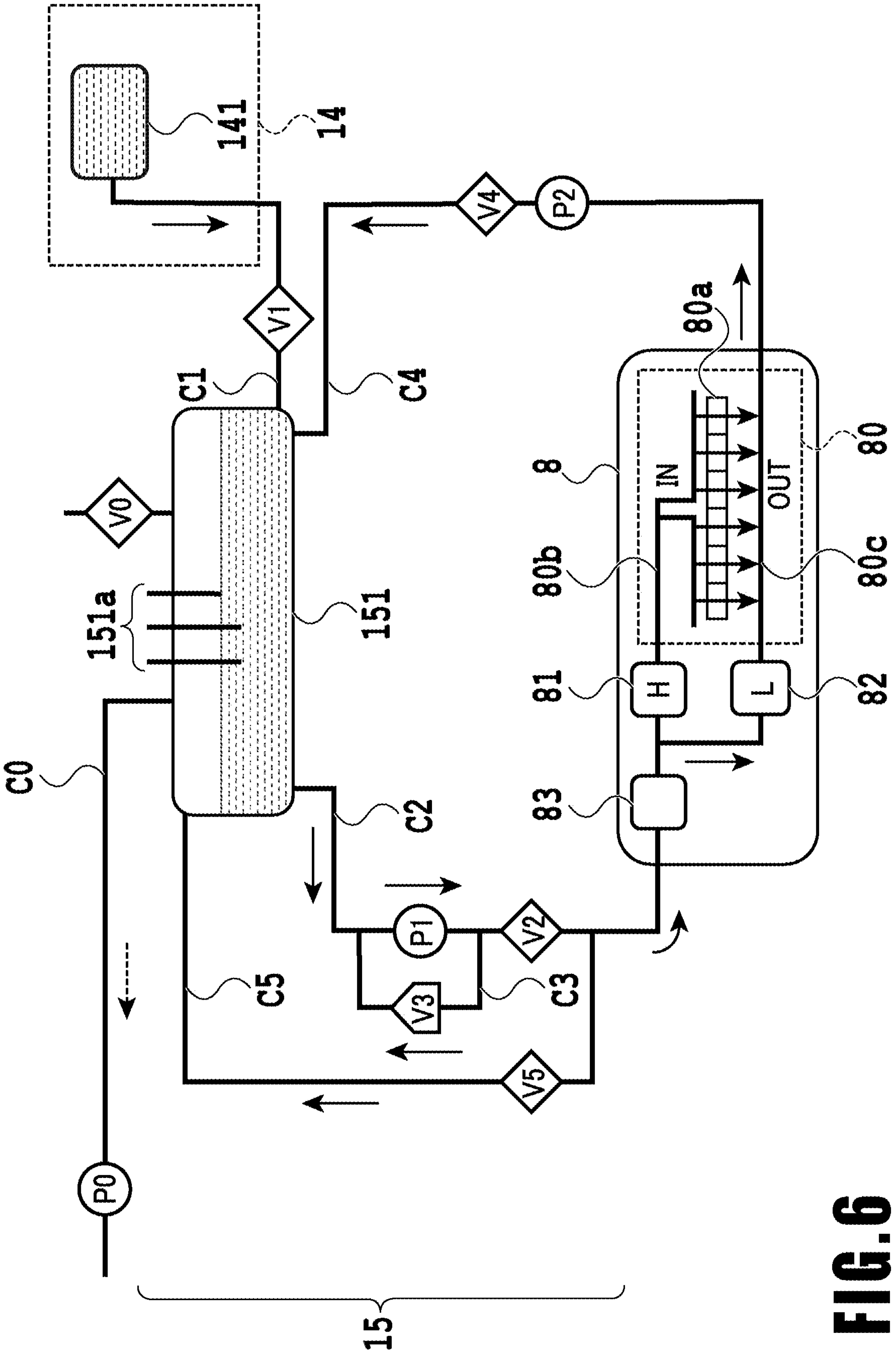
FIG. 6 is a schematic configuration diagram illustrating an ink supply system.

Next, the ink supply system of the print head 8 will be described. The present embodiment employs a circulation-type ink supply system as described above. FIG. 6 is a diagram illustrating the flow path configuration of the circulation-type ink supply system including the ink supply unit 15, employed in the inkjet printing apparatus 1 of the present embodiment. The ink supply unit 15 supplies ink supplied from the ink tank unit 14 to the print head 8. Although FIG. 6 shows the configuration for one color ink, such a configuration is actually prepared for each ink color. The ink supply unit 15 is basically controlled by the ink supply control unit 209 via the print controller 202. In other words, in the present embodiment, the print controller 202 (and the ink supply control unit 209) functions as a control unit that controls ink circulation in the flow paths. Next, constituents of the ink supply unit 15 will be described below.

Ink circulates mainly between a sub-tank 151 and the print head 8. In the print head 8, ink ejection operation is performed based on image data, and ink that was not ejected is collected back into the sub-tank 151. Since ink inside the ejection openings is exposed to the atmosphere, it is possible that the liquid component in the ink evaporates and the ink thickens, which decreases the ejection performance of the ejection openings. To address this situation, ink is circulated, and ink inside the ejection openings is replaced with fresh ink before the liquid component evaporates in an amount large enough to decrease the ejection performance of the ejection openings, thereby making it possible to suppress thickening and the like.

The sub-tank 151 that contains a certain amount of ink is connected to a supply flow path C2 for supplying ink to the print head 8 and a collection flow path C4 for collecting ink from the print head 8. In other words, the sub-tank 151, the supply flow path C2, the print head 8, and the collection flow path C4 compose a circulation flow path (circulation path) in which ink circulates. The sub-tank 151 is also connected to a flow path C0 in which air flows.

The sub-tank 151 is provided with a liquid level detection unit 151*a* including a plurality of electrode pins. The ink supply control unit 209 detects the presence/absence of a conducting current between those pins to grasp the height of the ink liquid surface level, that is, the amount of remaining ink inside the sub-tank 151. A vacuum pump P0 (in-tank vacuum pump) is a negative pressure generating source for depressurizing the inside of the sub-tank 151. An atmosphere release valve V0 is a valve for switching whether or not to make the inside of the sub-tank 151 communicate with the atmosphere.

A main tank 141 is a tank that contains ink to be supplied to the sub-tank 151. The main tank 141 is configured to be detachable from the printing apparatus body. The sub-tank 151 and the main tank 141 are connected with a tank connection flow path C1, on which is provided a tank supply valve V1 for switching the connection between the sub-tank 151 and the main tank 141.

In the case where the liquid level detection unit 151*a* detects that the amount of ink inside the sub-tank 151 is less than a certain amount, the ink supply control unit 209 closes the atmosphere release valve V0, a supply valve V2, a collection valve V4, and a head replacement valve V5. In addition, the ink supply control unit 209 opens the tank supply valve V1. In this state, the ink supply control unit 209 activates the vacuum pump P0. This makes the pressure inside the sub-tank 151 negative, so that ink is supplied from the main tank 141 to the sub-tank 151. In the case where the liquid level detection unit 151*a* detects that the amount of ink inside the sub-tank 151 exceeds a certain amount, the ink supply control unit 209 closes the tank supply valve V1 and stops the vacuum pump P0.

The supply flow path C2 is a flow path for supplying ink from the sub-tank 151 to the print head 8, and on the supply flow path C2 are provided a supply pump P1 and the supply valve V2. During print operation, the supply pump P1 is driven with the supply valve V2 open, supplying ink to the print head 8 while circulating ink in the circulation path. The amount of ink ejected per unit time by the print head 8 varies according to image data. The flow rate of the supply pump P1 is determined such that the flow rate can support the print head 8 performing ejection operation that requires maximum ink consumption per unit time.

A relief flow path C3 is a flow path which is located upstream of the supply valve V2 and which connects the upstream side and the downstream side of the supply pump P1. On the relief flow path C3 is provided a relief valve V3 which is a differential pressure valve. The relief valve V3 is not opened or closed by a drive mechanism. The relief valve V3 is urged by a spring and configured to open in the case where the pressure reaches a specified pressure. For example, in the case where the amount of ink supply from the supply pump P1 per unit time is larger than the sum value of the amount of ejection of the print head 8 per unit time and the amount of flow (the amount of pulled-back ink) through a collection pump P2 per unit time, the relief valve V3 opens according to the pressure applied to the relief valve V3. As a result, a cyclic flow path is formed which is composed of part of the supply flow path C2 and the relief flow path C3. Providing the relief flow path C3 allows the amount of ink supply to the print head 8 to be adjusted according to the amount of ink consumed by the print head 8, thus stabilizing the pressure inside the circulation path irrespective of image data.

The collection flow path C4 is a flow path for collecting ink from the print head 8 back to the sub-tank 151, and the collection pump P2 and the collection valve V4 are provided on the collection flow path C4. The collection pump P2 serves as a negative pressure generating source to suck ink from the print head 8 at the time of circulating ink within the circulation path. Driving the collection pump P2 generates an appropriate differential pressure between an IN flow path

80*b* and an OUT flow path 80*c* inside the print head 8, so that ink can be circulated between the IN flow path 80*b* and the OUT flow path 80*c*.

The collection valve V4 is a valve also for preventing backflow while print operation is not being performed, that is, while ink is not being circulated within the circulation path. In the circulation path of the present embodiment, the sub-tank 151 is located higher than the print head 8 in the vertical direction (see FIG. 1). For this reason, while the supply pump P1 or the collection pump P2 is not being driven, there is a possibility that ink flows back in the collection flow path C4 from the sub-tank 151 to the print head 8 due to a water head difference between the sub-tank 151 and the print head 8. In order to prevent such backflow, the collection valve V4 is provided on the collection flow path C4 in the present embodiment.

Note that the supply valve V2 also serves as a valve for preventing ink supply from the sub-tank 151 to the print head 8 while print operation is not being performed, that is, while ink is not being circulated within the circulation path.

A head replacement flow path C5 is a flow path connecting the supply flow path C2 and an air chamber (space in which ink is not contained) of the sub-tank 151, and the head replacement valve V5 is located on the head replacement flow path C5. One end of the head replacement flow path C5 is connected to a point upstream of the print head 8 and downstream of the supply valve V2 on the supply flow path C2. The other end of the head replacement flow path C5 is connected to an upper part of the sub-tank 151 to communicate with the air chamber inside the sub-tank 151. The head replacement flow path C5 is used in the case of pulling out ink from the print head 8 in use such as at the time of replacement of the print head 8 or at the time of transportation of the printing apparatus 1. The head replacement valve V5 is controlled by the ink supply control unit 209 so as to be closed except for a case of putting ink into the print head 8 and a case of collecting ink from the print head 8 via the head replacement valve V5.

Next, the flow path configuration inside the print head 8 will be described. Ink supplied through the supply flow path C2 to the print head 8 passes through a filter 83 and then is supplied to a first negative pressure control unit 81 and a second negative pressure control unit 82. The first negative pressure control unit 81 has a control pressure set to a low negative pressure (negative pressure having a small pressure difference from atmospheric pressure). The second negative pressure control unit 82 has a control pressure set to a high negative pressure (negative pressure having a large pressure difference from atmospheric pressure). The pressures of those first negative pressure control unit 81 and second negative pressure control unit 82 are generated within adequate ranges by driving the collection pump P2.

The print head 8 includes an ink ejection unit 80 for ejecting ink. In this ink ejection unit 80, a plurality of printing element substrates 80*a*, each having arrayed multiple ejection openings, are arranged to form an elongate ejection opening array. A common supply flow path 80*b* (IN flow path) for guiding ink supplied from the first negative pressure control unit 81 and a common collection flow path 80*c* (OUT flow path) for guiding ink supplied from the second negative pressure control unit 82 also extend in the direction in which the printing element substrates 80*a* are arrayed. Each printing element substrate 80*a* has individual supply flow paths connected to the common supply flow path 80*b* and individual collection flow paths connected to the common collection flow path 80*c*. Thus, an ink flow is generated in each printing element substrate 80*a* such that ink flows in from the common supply flow path 80*b* having a relatively lower negative pressure and flows out to the common collection flow path 80*c* having a relatively higher negative pressure. A pressure chamber which communicates with each ejection opening and is charged with ink is provided on a path between the individual supply flow path and the individual collection flow path, so that an ink flow is also generated even in the ejection openings and pressure chambers where printing is not performed. In the case where ejection operation is performed in the printing element substrate 80*a*, part of the ink moving from the common supply flow path 80*b* to the common collection flow path 80*c* is ejected from the ejection opening and thus is consumed, and the ink that was not ejected moves into the collection flow path C4 through the common collection flow path 80*c*.

Figure 7A:
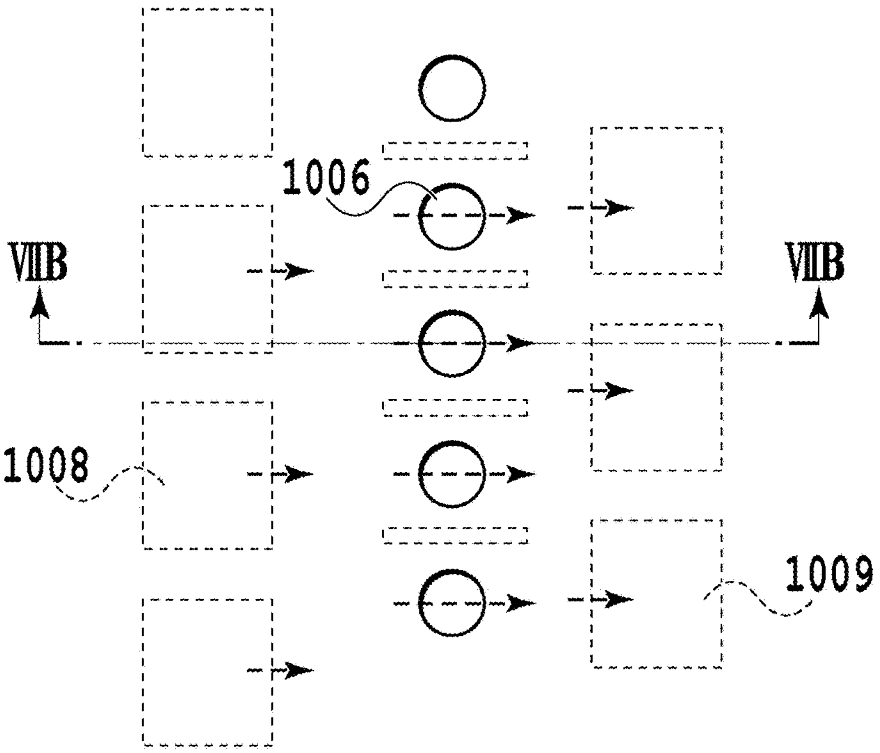
FIGS. 7A and 7B are diagrams for explaining ink flows in flow paths including ejection openings.
Figure 7B:
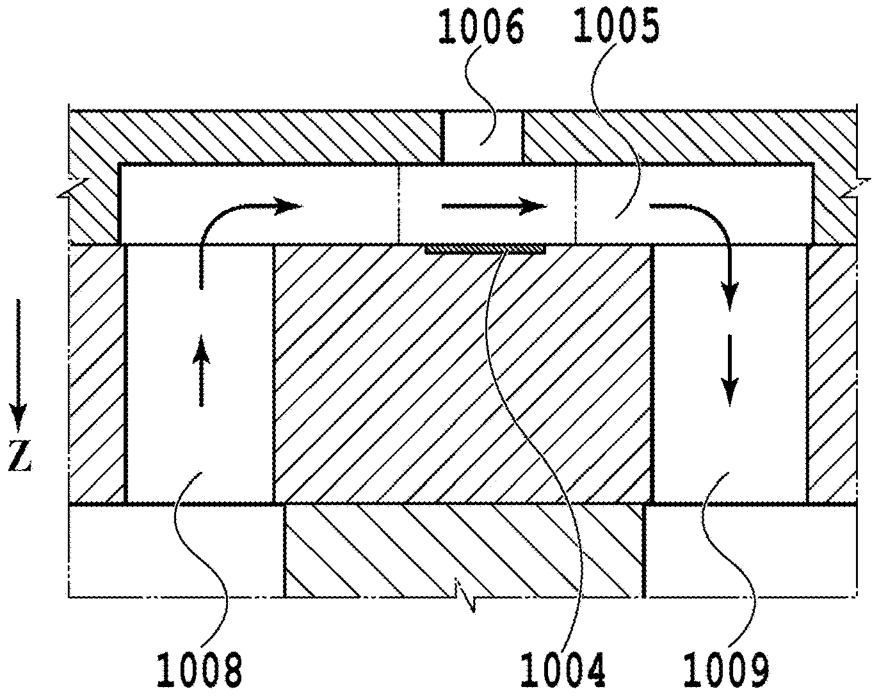

FIG. 7A is an enlarged schematic plan view of part of the printing element substrate 80*a*, and FIG. 7B is a schematic cross-sectional view taken along line VIIB-VIIB in FIG. 7A. The printing element substrate 80*a* has a pressure chamber 1005 which is filled with ink and an ejection opening 1006 for ejecting ink. In the pressure chamber 1005, a printing element 1004 is provided at a position facing the ejection opening 1006. The printing element substrate 80*a* has individual supply flow paths 1008 connected to the common supply flow path 80*b* and individual collection flow paths 1009 connected to the common collection flow path 80*c* for respective ejection openings 1006.

The foregoing configuration generates, in the printing element substrate 80*a*, an ink flow in which ink flows in from the common supply flow path 80*b* having relatively a low negative pressure (the absolute value of the pressure is high) and flows out to the common collection flow path 80*c* having a relatively high negative pressure (the absolute value of the pressure is low). To be more specific, ink flows in the order of the common supply flow path 80*b*, the individual supply flow path 1008, the pressure chamber 1005, the individual collection flow path 1009, and the common collection flow path 80*c*. When ink is ejected by the printing element 1004, part of the ink moving from the common supply flow path 80*b* to the common collection flow path 80*c* is ejected through the ejection opening 1006 and thus discharged to the outside of the print head 8. The ink that was not ejected from the ejection opening 1006 is collected into the collection flow path C4 through the common collection flow path 80*c*.

With the configuration above, at the time of performing print operation, the ink supply control unit 209 closes the tank supply valve V1 and the head replacement valve V5, opens the atmosphere release valve V0, the supply valve V2, and the collection valve V4, and drives the supply pump P1 and the collection pump P2. As a result, a circulation path composed of the sub-tank 151, the supply flow path C2, the print head 8, the collection flow path C4, and the sub-tank 151 is established. In the case where the amount of ink supply per unit time from the supply pump P1 is larger than the sum value of the ejection amount per unit time of the print head 8 and the amount of flow per unit time through the collection pump P2, ink flows into the relief flow path C3 from the supply flow path C2. Thus, the flow rate of the ink flowing into the print head 8 from the supply flow path C2 is adjusted.

While print operation is not being performed, the ink supply control unit 209 does not operate the supply pump P1 and the collection pump P2 and keeps closed the atmosphere release valve V0, the supply valve V2, and the collection valve V4. Thereby the flow of ink inside the print head 8 is stopped, and the backflow due to the water head difference between the sub-tank 151 and the print head 8 is also prevented. In addition, closing the atmosphere release valve V0 prevents ink leakage and the evaporation of ink from the sub-tank 151.

In the case of collecting ink from the print head 8, the ink supply control unit 209 closes the atmosphere release valve V0, the tank supply valve V1, the supply valve V2, and the collection valve V4, opens the head replacement valve V5, and drives the vacuum pump P0. As a result, the pressure inside sub-tank 151 becomes negative, and the ink inside the print head 8 is collected into the sub-tank 151 through the head replacement flow path C5. Hence, the head replacement valve V5 is a valve which is closed in the ordinary print operation and in the standby state and is opened at the time of collecting ink from the print head 8. Note that the head replacement valve V5 is also opened at the time of filling the head replacement flow path C5 with ink in the case of filling the print head 8 with ink.

First, a first embodiment of the printing apparatus 1 will be described with reference to FIGS. 8 to 10 in which the vacuum wiping process is performed as a suction process. As described above, the vacuum wiping process is a process of performing wiping operation using the vacuum wiper unit 172. Vacuum wiping is, as described above, a recovery process to keep favorable the ejection performance of each ejection opening in the ejection opening surface 8*a* and also recover it by sucking ink, foreign objects, and the like attached to the ejection opening surface 8*a* while wiping them with the vacuum wiper 172*c*. The vacuum wiping process is, as described above, executed after wiping operation with the blade wiper unit 171 in the second wiping process. The vacuum wiping process is executed at a timing based on the number of conveyed print media S, the time elapsed since the latest vacuum wiping process, and other factors.

Figure 8:
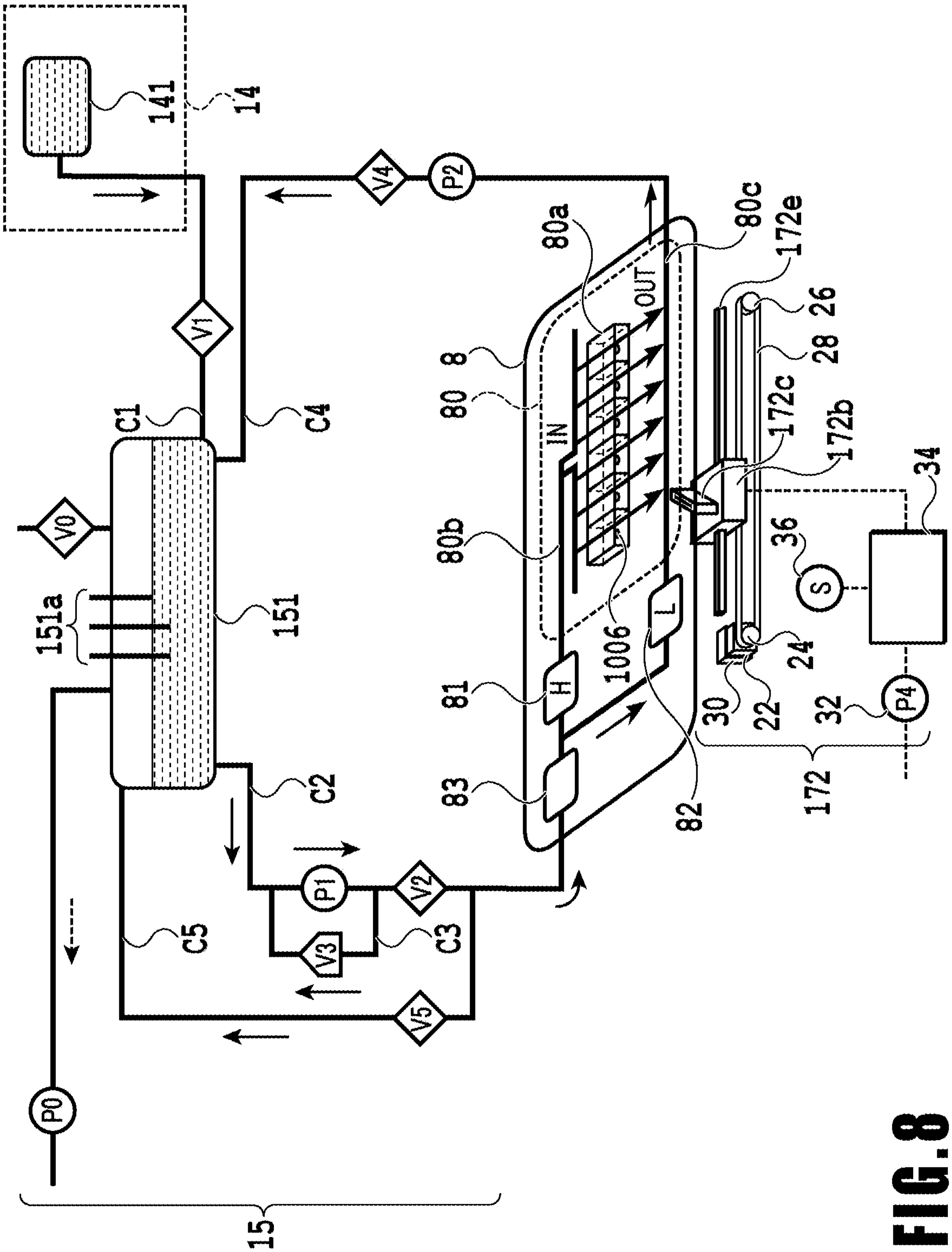
FIG. 8 is a diagram illustrating main constituents of a printing apparatus according to a first embodiment of the present invention.

FIG. 8 is a schematic configuration diagram illustrating main parts of the print head 8 and ink supply unit 15 and the vacuum wiper unit 172 of the printing apparatus 1 according to the first embodiment. The printing apparatus 1, as described above, includes a circulation mechanism capable of circulating ink through the flow paths, including the ejection openings, in the print head 8. The printing apparatus 1 also includes the vacuum wiper unit 172 which wipes the ejection openings in the ejection opening surface 8*a* while sucking them, by moving being in contact with the print head 8.

In the vacuum wiper unit 172, the carriage 172*b* on which the vacuum wiper 172*c* is mounted is slidably disposed on a guide rail 172*e* extending in the y-direction. This carriage 172*b* moves in the forward and backward directions of the y-direction by means of a motor 22 driven by the print controller 202 via the maintenance control unit 210. Thus, the vacuum wiper 172*c* mounted on the carriage 172*b* is configured to be movable in the y-direction via the carriage 172*b*. In the present embodiment, the direction from the right toward the left in FIG. 8 is defined as the forward direction, and the direction from the left toward the right is defined as the backward direction. In the present embodiment, vacuum wiping is performed only while the vacuum wiper 172*c* is moving in the forward direction via the carriage 172*b*.

The motor 22 is connected to a pulley 24 via a gear (not illustrated) and other parts. Between the pulley 24 and an idler pulley 26 disposed a certain distance away from the pulley 24 in the y-direction is put a belt 28 in a tensioned state. Thus, the belt 28 rotates driven by the motor 22. The belt 28 extends in the y-direction and is in parallel with the guide rail 172*e*. The carriage 172*b* is fixed to the belt 28. Thus, the rotation of the belt 28 moves the carriage 172*b* along the guide rail 172*e*, and the rotation direction of the belt 28 determines the moving direction of the carriage 172*b*. The motor 22 is connected to a rotary encoder 30 capable of detecting the amount of rotation, the rotation direction, and the like of the motor 22. The print controller 202 detects the moving direction, the moving distance, and the like of the carriage 172*b* based on detection results of this rotary encoder 30.

The vacuum wiper 172*c* has an opening 21 (see FIG. 9B) adapted to come into contact with the ejection opening surface 8*a* and perform suction on the ejection opening surface 8*a* and is configured to be capable of performing suction for the ejection openings in the ejection opening surface 8*a* sequentially by moving in the y-direction with the opening 21 in contact with the ejection opening surface 8*a*. The vacuum wiper 172*c* is connected to the suction pump 32 via a tube (not illustrated) and other parts. Between the suction pump 32 and the vacuum wiper 172*c* is disposed a buffer tank 34 the inside space of which is adapted to be depressurized by the suction pump 32. The buffer tank 34 has a pressure sensor 36 capable of measuring the internal pressure. Driving of the suction pump 32 is controlled by the print controller 202 via the maintenance control unit 210. In this operation, the print controller 202 monitors the pressure inside the buffer tank 34 with the pressure sensor 36.

In the present embodiment, the vacuum wiper unit 172, buffer tank 34, suction pump 32, and other components function as a suction unit that performs suction for the ejection openings in the ejection opening surface 8*a* sequentially. In addition, in the present embodiment, the print controller 202 (and the maintenance control unit 210) functions as a control unit that controls driving of the suction unit, such as moving the carriage 172*b*, driving the suction pump 32, and other operations.

Figure 9A:
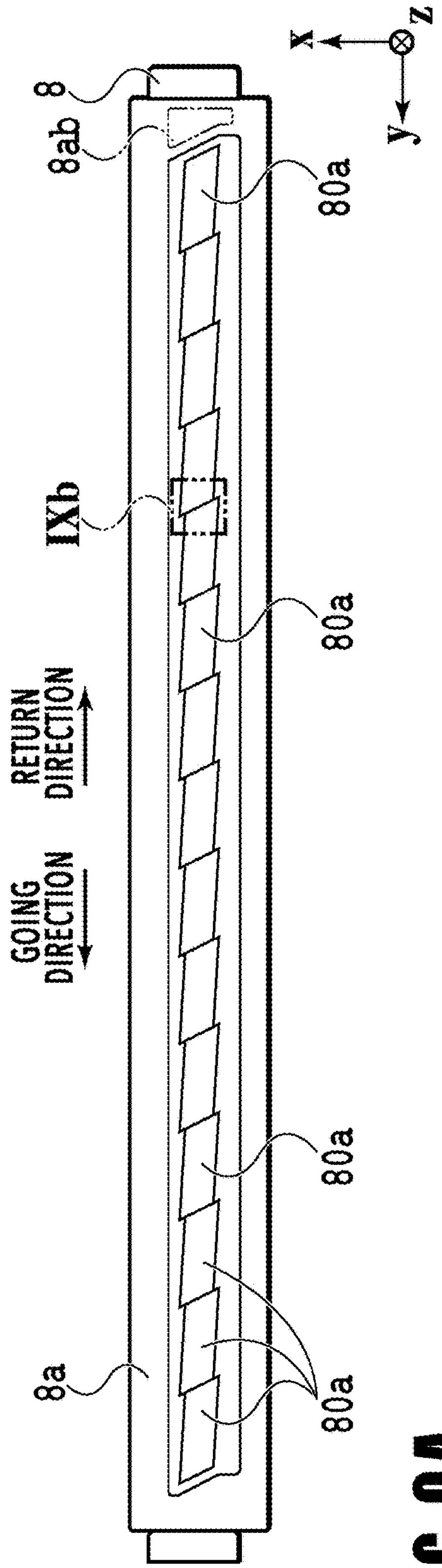
FIGS. 9A and 9B are diagrams illustrating substrates disposed on an ejection opening surface and ejection openings formed in the substrates.
Figure 9B:
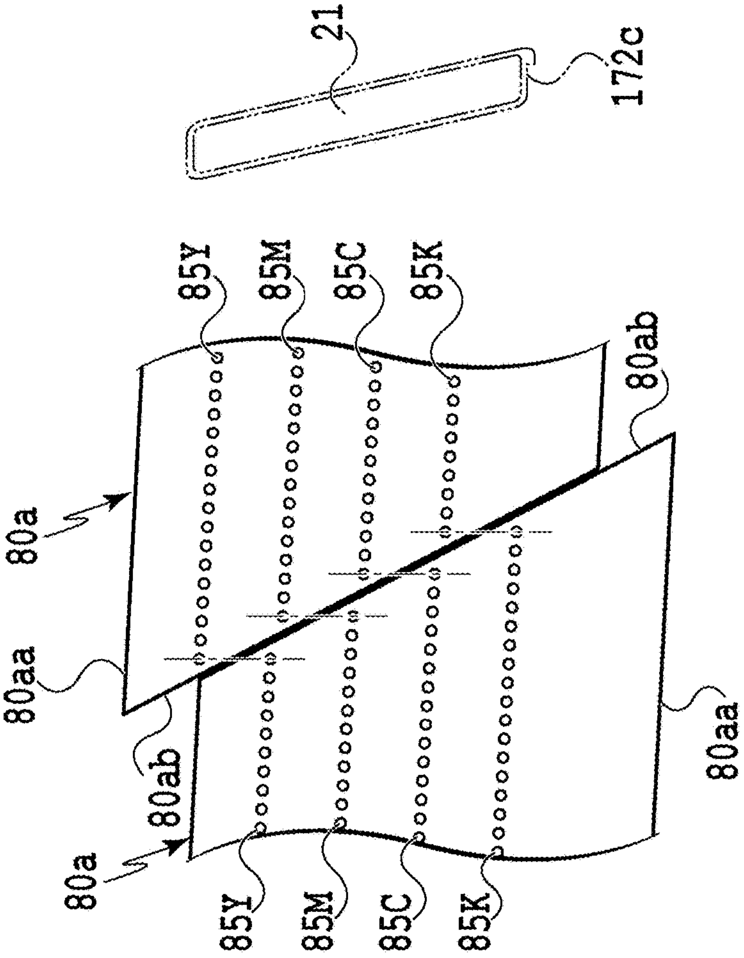
Figure 10:
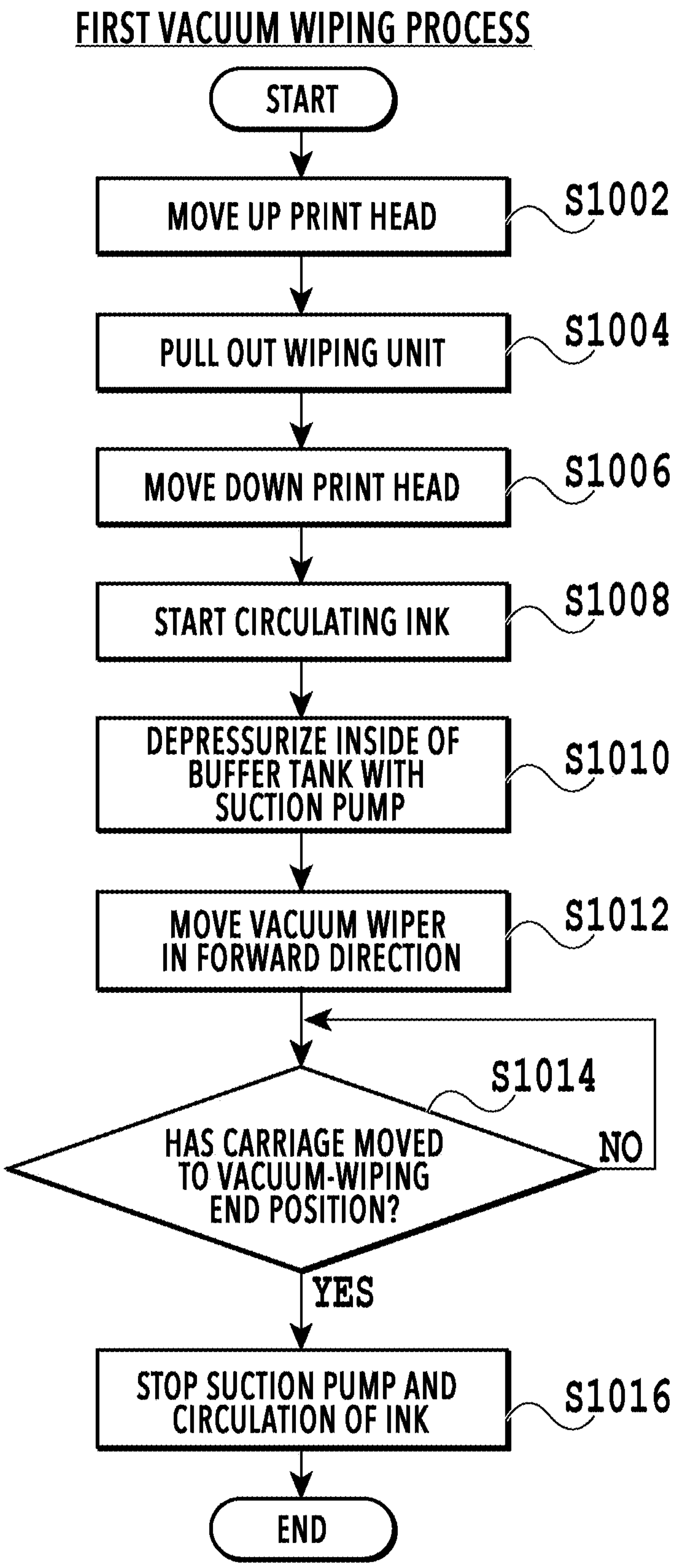
FIG. 10 is a flowchart illustrating the process procedure of a first vacuum wiping process.

FIG. 9A is a schematic configuration diagram illustrating the ejection opening surface 8*a* of the print head 8; FIG. 9B is a partially enlarged view of the frame IXB in FIG. 9A. FIG. 9A is a view of the ejection opening surface 8*a* from the bottom surface, which is simplified to make it easy to understand by omitting a wiring sealing portion and other parts.

On the ejection opening surface 8*a*, multiple printing element substrates 80*a* are arranged along the y-direction, each having the same dimensions and the same configuration. In vacuum wiping, the suction process is performed as a recovery process for the ejection openings provided in the printing element substrates 80*a* while the carriage 172*b* is being moved in the forward direction by the print controller 202 via the motor 22. Note that at one end portion of the ejection opening surface 8*a* (the right end portion in FIG. 9A) is formed a suction preparation surface 8*ab*. The vacuum wiper 172*c* positioned at the vacuum-wiping start position for starting vacuum wiping comes into contact with the suction preparation surface 8*ab*. The suction preparation surface Bab is adapted to close the opening 21 in the state where it is in contact with the vacuum wiper 172*c*.

The printing element substrate 80*a* has multiple ejection opening rows each including arrayed ejection openings for ejecting ink. In the present embodiment, it is assumed that the printing apparatus 1 uses four colored inks—black, cyan, magenta, and yellow—to perform printing. Specifically, the print head 8 is configured to be capable of ejecting four colored inks onto print media S to perform printing. Accordingly, in the printing element substrate 80*a*, ejection opening rows 85K, 85C, 85M, and 85Y respectively corresponding to the colors—black, cyan, magenta, and yellow—are formed to be approximately in parallel with the long sides 80*aa* of the printing element substrate 80*a*.

The printing element substrates 80*a*, each having a shape of a parallelogram and being inclined by a specified angle relative to the y-direction, are arrayed along the y-direction such that each printing element substrate 80*a* adjoins the next one with their short sides 80*ab* in contact with each other. Hence, also the ejection opening rows are inclined relative to the y-direction by a specified angle, and parts of the ejection openings for ejecting ink of the same color of adjoining two printing element substrates 80*a* are overlapped in the y-direction (see FIG. 9B). As described above, in the present embodiment, multiple printing element substrates 80*a*, each having the ejection opening rows with a short length, are arranged side by side in the y-direction, so that ejection opening rows with a long length are formed on the ejection opening surface 8*a*. Note that the opening 21 of the vacuum wiper 172*c* which performs suction on the ejection opening surface 8*a* has a size that covers, for example, one or several ejection openings in the y-direction and crosses all the ejection opening rows in the x-direction.

With the above configuration, execution of vacuum wiping using the vacuum wiper unit 172 will be described. In the second wiping process, the vacuum wiping process, vacuum wiping using the vacuum wiper unit 172, is executed after the wiping process using the blade wiper unit 171. In the following description, the vacuum wiping process will be described in detail. Note that the vacuum wiping process executed in the present embodiment is referred to as a first vacuum wiping process in the following description. FIG. 10 is a flowchart illustrating detailed process procedure of the first vacuum wiping process executed in the second wiping process.

When the first vacuum wiping process starts, first the print controller 202 makes the print head 8, which is then at a position where the print head 8 can comes into contact with the blade wiper 171*a*, retreat to a position higher in the vertical direction than a wiping position illustrated in FIG. 4 (S1002). Next the print controller 202 slides and pulls out the wiping unit 17 housed in the maintenance unit 16 to a specified position (S1004).

After that, the print controller 202 moves down the print head 8 to the wiping position illustrated in FIG. 4 (S1006). At this time, the carriage 172*b* is at the vacuum-wiping start position which is at one end side in the y-direction of the wiping unit 17. Then, the vacuum wiper 172*c* mounted on the carriage 172*b* comes into contact with the suction preparation surface Bab on the ejection opening surface 8*a*.

Next, ink circulation starts (S1008). Specifically, at S1008, the print controller 202, via the ink supply control unit 209, closes the tank supply valve V1 and the head replacement valve V5, opens the atmosphere release valve V0, the supply valve V2, and the collection valve V4, and drives the supply pump P1 and the collection pump P2. With this operation, the ink stored in the sub-tank 151 passes through the supply flow path C2, print head 8, and collection flow path C4 in this order and returns to the sub-tank 151. In this operation, ink is circulated in the print head 8 such that ink flows through the pressure chambers 1005 respectively corresponding to all the ejection openings of the print head 8. Note that the ink circulation at this S1008 is performed for each of the inks used in the printing apparatus 1, in other words, black ink, cyan ink, magenta ink, and yellow ink.

After ink circulation starts as above, next the pressure inside the buffer tank 34 is depressurized until it reaches a set value (S1010). Specifically, at S1010, the print controller 202 drives the suction pump 32 until the pressure inside the buffer tank 34 reaches the set value, based on the detection results of the pressure sensor 36. The vacuum wiper 172*c* communicates with the buffer tank 34 with a tube or the like. Thus, in the case where the buffer tank 34 is depressurized, the opening 21, which is now in contact with the ejection opening surface 8*a*, applies a negative pressure corresponding to the set value to the ejection opening surface 8*a* with which the opening 21 is in contact. After the suction pump 32 has depressurized the buffer tank 34 to the set value, the suction pump 32 is driven such that this set value is kept within a specified range.

Then, after the buffer tank 34 has been depressurized to the set value, vacuum wiping is performed for the ejection openings of the printing element substrates 80*a* on the ejection opening surface 8*a* by moving the vacuum wiper 172*c* in the forward direction with the vacuum wiper 172*c* in contact with the ejection opening surface 8*a* (S1012). Specifically, at S1012, the print controller 202 drives the motor 22 to move the carriage 172*b* in the forward direction, so that the vacuum wiper 172*c* moves in the forward direction with the opening 21 performing suction on the ejection opening surface 8*a*.

After that, it is determined whether the carriage 172*b* has moved to a vacuum-wiping end position set in advance (S1014). Specifically, at S1014, the print controller 202 makes determination based on the detection results of the rotary encoder 30. If it is determined at S1014 that the carriage 172*b* has moved to the vacuum-wiping end position, it is determined that the vacuum wiping has been finished, and driving of the suction pump 32 and ink circulation are stopped (S1016). Here this first vacuum wiping process ends. Specifically, at S1016, the print controller 202 stops driving the suction pump 32, supply pump P1, and collection pump P2.

When the first vacuum wiping process ends as above, the print controller 202 makes the print head 8 retreat vertically upward. Then, at the timing when the vacuum wiper 172*c* is apart from the ejection opening surface 8*a*, the print controller 202 moves the carriage 172*b* in the backward direction to the vacuum-wiping start position which is on the one end side in the y-direction.

As has been described above, the printing apparatus 1 has the circulation mechanism which circulates ink between the sub-tank 151 and the flow paths, including the ejection openings, in the print head 8. The printing apparatus 1 also has the vacuum wiper 172*c* which performs suction sequentially for the ejection openings on the ejection opening surface 8*a* of the print head 8. Then the circulation mechanism circulates ink in vacuum wiping. Although the ejection opening rows are long in the printing apparatus 1, and the ejection openings are exposed to the atmosphere for a long time during vacuum wiping, the circulation of ink suppresses ink thickening inside the ejection openings. Thus, degradation in the ejection performance of the ejection openings due to ink thickening is suppressed in vacuum wiping for keeping and recovering the ejection performance of the ejection openings.

Note that in a case where ink circulation can be controlled for each printing element substrate 80*a*, ink circulation may start for each printing element substrate 80*a* having the ejection openings for which vacuum wiping has been finished.

Second Embodiment

Next, a second embodiment of a printing apparatus according to the present invention will be described with reference to FIGS. 11A to 11C and 12. Note that in the following description, the constituents the same as or corresponding to those in the above printing apparatus 1 are denoted by the same reference numerals, and description thereof is omitted as appropriate.

The printing apparatus 1 according to this second embodiment is different from the printing apparatus 1 according to the above first embodiment in that in the vacuum wiping process, ink circulation is performed in only the circulation route for circulating a specified ink.

Specifically, the printing apparatus 1 is configured to perform printing using black ink, cyan ink, magenta ink, and yellow ink. Of these four kinds of inks, circulation is performed in the vacuum wiping process only in the circulation route for the ink the properties of which may change and which may decrease the ejection performance of the ejection openings in the case where the ink stays in the ejection openings and is kept exposed to the atmosphere. The present embodiment will be described for the case where black ink thickens more easily than the other three inks and thus is more likely to decrease the ejection performance of the ejection openings.

Figure 11A:
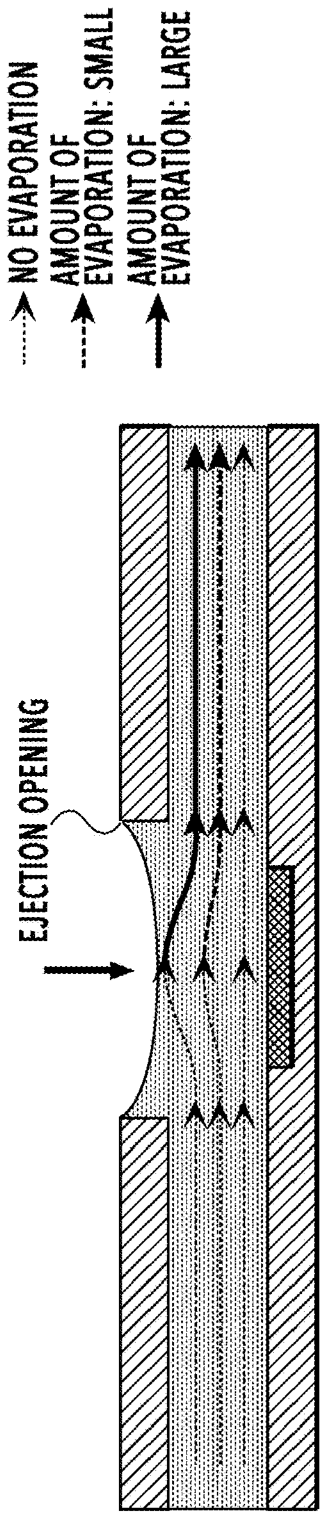
FIGS. 11A, 11B, and 11C are diagrams for explaining ink thickening caused in circulation in a flow path including an ejection opening.
Figure 11B:
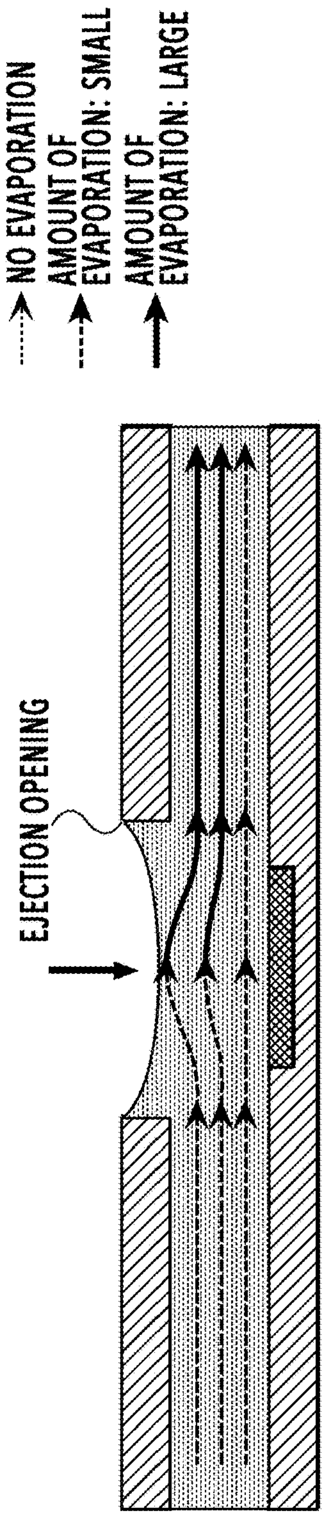
Figure 11C:
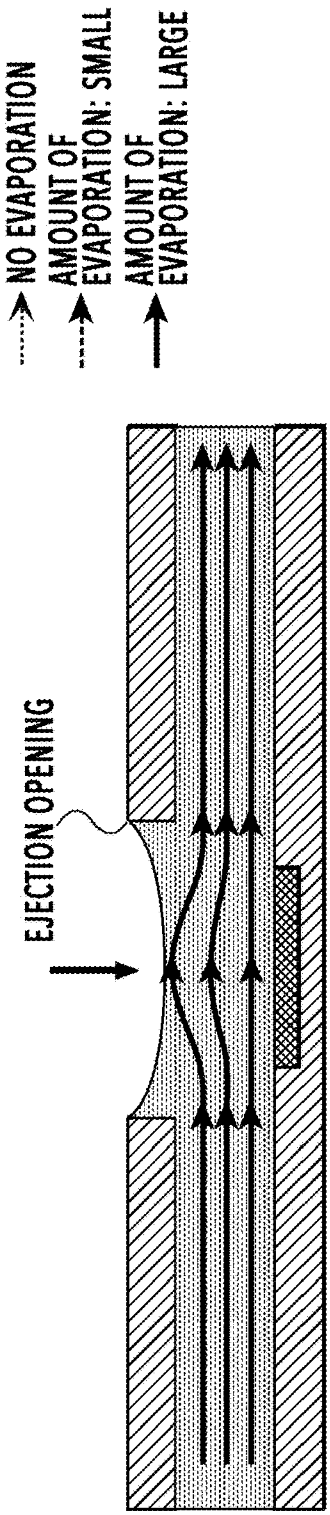

FIGS. 11A to 11C are diagrams illustrating a flow path through which ink around the ejection opening flows. In the state where ink is being circulated, circulating ink is exposed to the atmosphere sequentially when it is passing by the meniscus in the ejection opening. Thus, the ink component, mainly the liquid component in the ink, evaporates from the meniscus (see FIG. 11A). Hence, even for ink kept circulating, the ink component evaporates little by little, and this may eventually thicken the entire ink (see FIGS. 11B and 11C).

However, the black ink may thicken inside the ejection openings only by staying in the ejection openings and being kept exposed to the atmosphere, decreasing the ejection performance of these ejection openings. In other words, for the black ink, compared to the other three inks, the degree of increase in viscosity due to the evaporation of the ink component is higher than or equal to a specified degree under specified conditions. To avoid such decrease in the ejection performance of the ejection openings, the black ink is circulated in vacuum wiping. The other three inks are less likely to thicken and decrease the ejection performance of the ejection openings even though they stay in the ejection openings and are kept exposed to the atmosphere. Hence, for cyan ink, magenta ink, and yellow ink, circulation for avoiding the ink thickening described with reference to FIGS. 11A to 11C is not performed in vacuum wiping.

Figure 12:
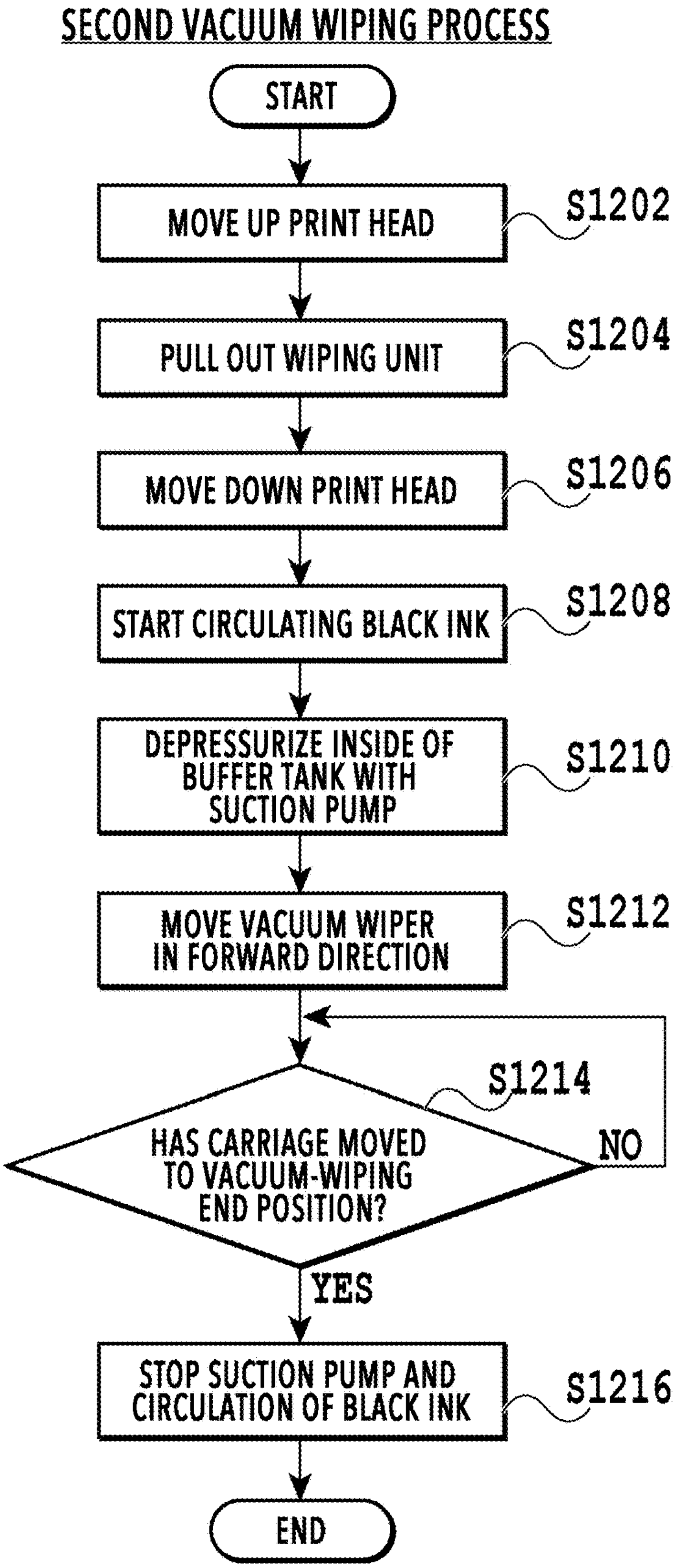
FIG. 12 is a flowchart illustrating the process procedure of a second vacuum wiping process.

Because the configuration of the printing apparatus 1 in the present embodiment is the same as that of the above first embodiment, only the vacuum wiping process will be described in the following. FIG. 12 is a flowchart illustrating detailed process procedure of the vacuum wiping process executed in the second wiping process. Note that the vacuum wiping process executed in the present embodiment is referred to as a second vacuum wiping process in the following description.

When the second vacuum wiping process starts, first the print head 8 is made to retreat to a position higher in the vertical direction than the wiping position illustrated in FIG. 4 (S1202), and the wiping unit 17 is slid and pulled out to a specified position (S1204). Next the print head 8 is moved down to the wiping position illustrated in FIG. 4, and the vacuum wiper 172*c* and the suction preparation surface Bab of the ejection opening surface 8*a* are brought into contact with each other (S1206). The concrete process details of S1202 to S1206 are the same as those of the above S1002 to S1006.

After that, circulation of black ink starts (S1208). Specifically, at S1208, the print controller 202 closes the tank supply valve V1 and the head replacement valve V5, opens the atmosphere release valve V0, the supply valve V2, and the collection valve V4, and drives the supply pump P1 and the collection pump P2, for the circulation route of black ink. Note that in this process, valves are not operated, nor are pumps driven for the circulation routes of cyan ink, magenta ink, and yellow ink.

When the circulation of black ink starts, the buffer tank 34 is depressurized until the pressure inside reaches the set value (S1210), then vacuum wiping is performed by moving the vacuum wiper 172*c* in the forward direction with the vacuum wiper 172*c* in contact with the ejection opening surface 8*a* (S1212). Then, it is determined whether the carriage 172*b* has moved to the vacuum-wiping end position (S1214). If it is determined at S1214 that the carriage 172*b* has moved to the vacuum-wiping end position, driving of the suction pump 32 and the circulation of black ink are stopped (S1216), and this second vacuum wiping process ends. Note that the concrete process details of S1210 to S1214 are the same as those of the above S1010 to S1014. At S1216, the print controller 202 stops driving the suction pump 32, supply pump P1, and collection pump P2 on the circulation route of black ink.

When the second vacuum wiping process ends as above, the print head 8 is made to retreat vertically upward, and at the timing when the vacuum wiper 172*c* is apart from the ejection opening surface 8*a*, the carriage 172*b* is moved to the vacuum-wiping start position.

As has been described above, in the printing apparatus 1, circulation is performed in the vacuum wiping process only for the ink that may thickens and decrease the ejection performance of the ejection openings in the case where the ink stays in the ejection openings and is kept exposed to the atmosphere. Hence, for the inks that are less likely to thicken even in the case where the inks stay at the ejection openings and are kept exposed to the atmosphere, thickening due to circulation is less likely to occur, and thus it is possible to keep the performance of the inks favorable.

Third Embodiment

Next, a third embodiment of a printing apparatus according to the present invention will be described with reference to FIGS. 13 and 14. Note that in the following description, the constituents the same as or corresponding to those in the above printing apparatus 1 are denoted by the same reference numerals, and description thereof is omitted as appropriate.

The printing apparatus 1 according to this third embodiment is different from the printing apparatus 1 according to the above first embodiment in the following three points. The carriage 172*b* is slidably disposed on guide rails 172*f* instead of the guide rail 172*e*. The two guide rails 172*f* are arranged to extend through both sides of the carriage 172*b*, so that in the case where the print head 8 ejects ink, the ink will not attach to the guide rails 172*f* In addition, the printing apparatus 1 include an ink receiver 38 is included. Further, in the vacuum wiping process, preliminary ejection is performed for ejecting ink that does not contribute to image printing, instead of ink circulation.

Figure 13:
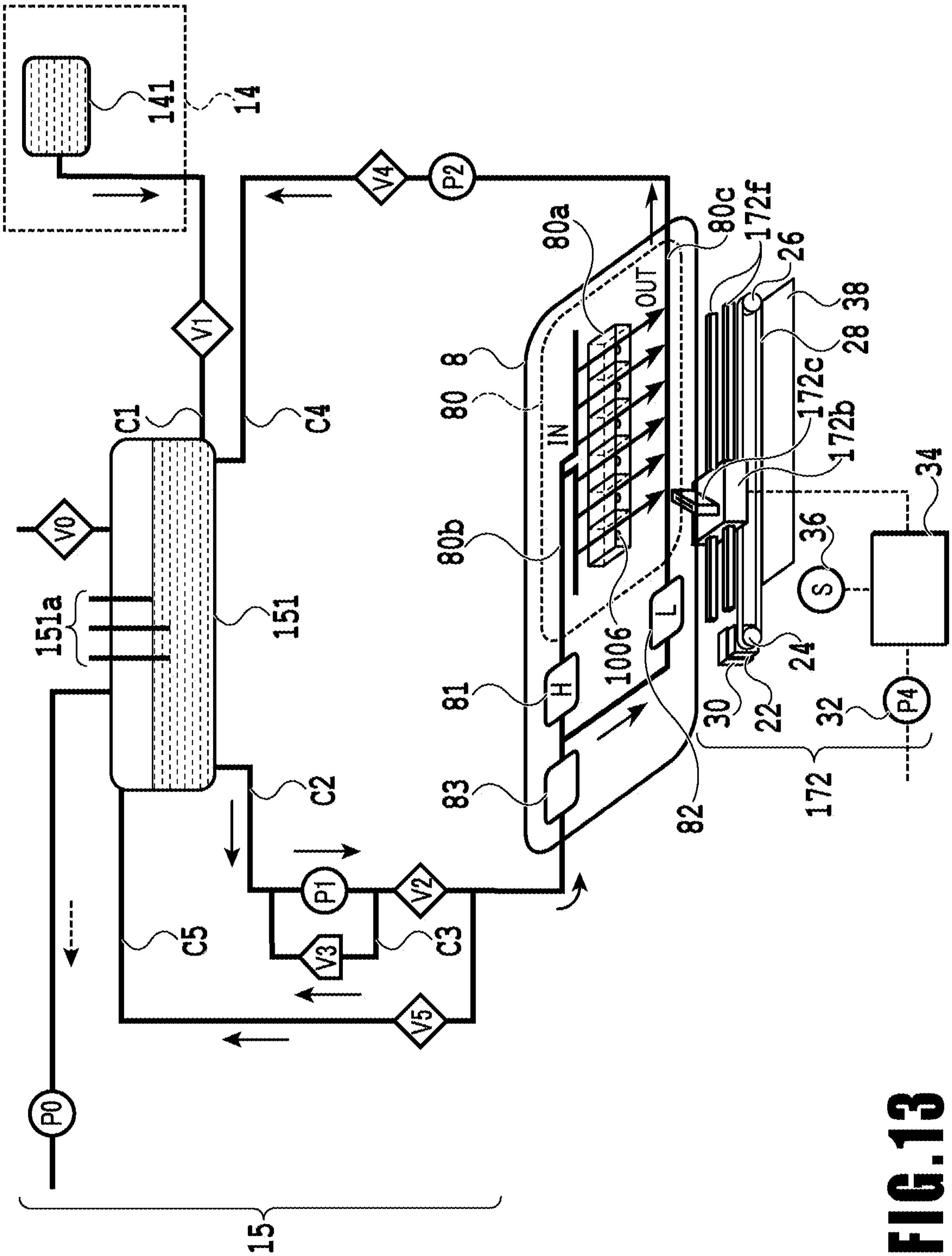
FIG. 13 is a diagram illustrating main constituents of a printing apparatus according to a third embodiment of the present invention.
Figure 14:
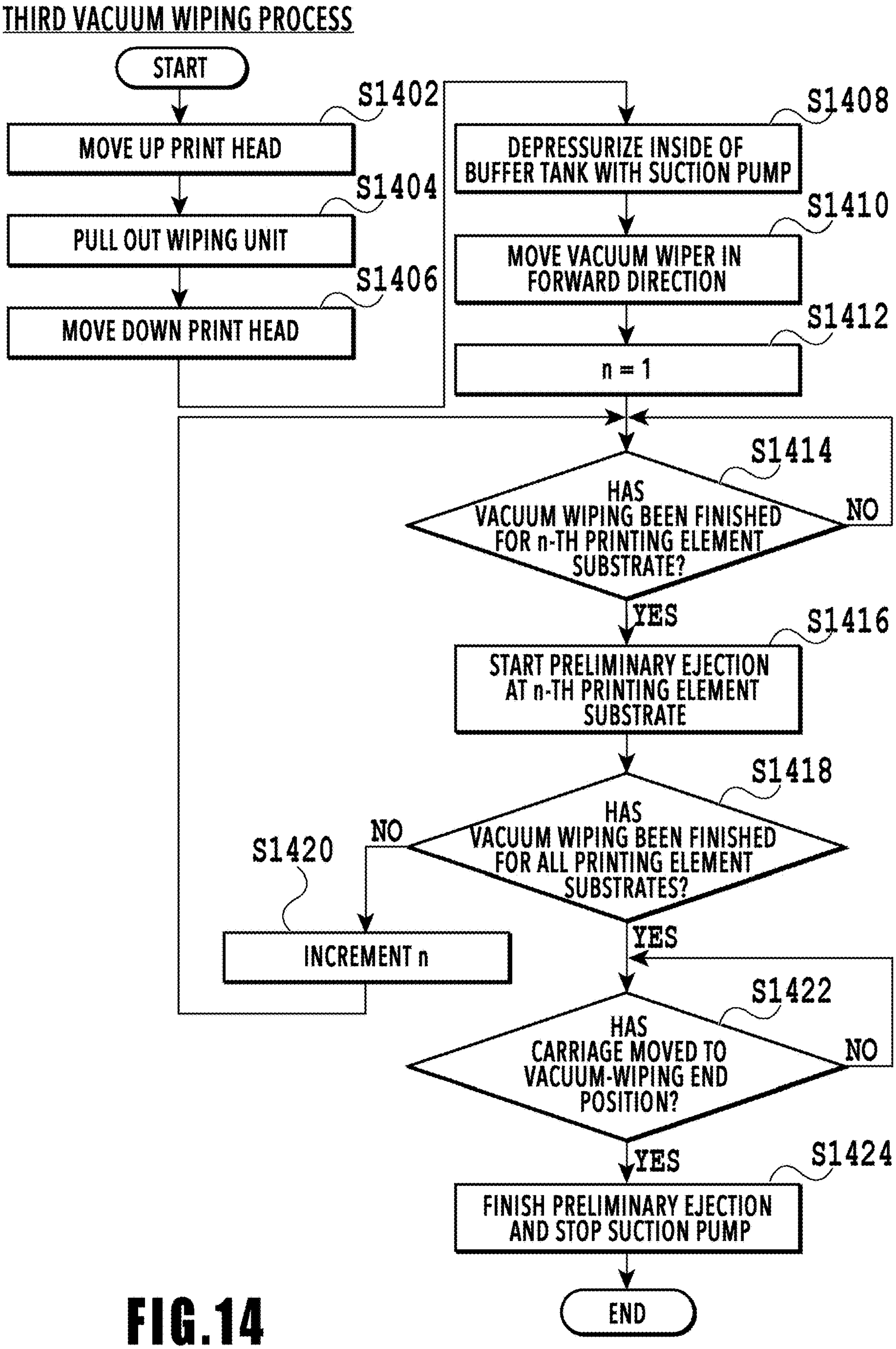
FIG. 14 is a flowchart illustrating the process procedure of a third vacuum wiping process.

FIG. 13 is a schematic configuration diagram illustrating main parts of the print head 8 and ink supply unit 15 and the vacuum wiper unit 172 of the printing apparatus 1 according to the third embodiment. The carriage 172*b* is slidably disposed on a pair of the guide rails 172*f* spaced in the x-direction and extending in the y-direction. The ink receiver 38 extending in the y-direction is located vertically under the carriage 172*b*. The ink receiver 38 is a member for receiving ink ejected from the ejection openings in the preliminary ejection. The configuration of the printing apparatus 1 in the present embodiment is the same as that of the above first embodiment except the guide rails 172*f* and the ink receiver 38 described above.

Specifically, in the printing apparatus 1 according to the first embodiment, during vacuum wiping for maintaining and recovering the ejection performance of the ejection openings, in other words, during the suction process, the ink circulation process is executed to maintain and recover the ejection performance of the ejection openings. Compared to this operation, in the printing apparatus 1 according to the third embodiment, preliminary ejection for maintaining and recovering the ejection performance of the ejection openings is executed during execution of vacuum wiping for maintaining and recovering the ejection performance of the ejection openings.

Next, the vacuum wiping process will be described. FIG. 14 is a flowchart illustrating detailed process procedure of the vacuum wiping process executed in the second wiping process. Note that the vacuum wiping process executed in the present embodiment is referred to as third vacuum wiping in the following description.

When the third vacuum wiping process starts, first the print head 8 is made to retreat vertically upward to the wiping position illustrated in FIG. 4 (S1402), and the wiping unit 17 is slid and pulled out to the specified position. Next the print head 8 is moved down to the wiping position illustrated in FIG. 4, and the vacuum wiper 172*c* and the suction preparation surface Bab of the ejection opening surface 8*a* are brought into contact with each other (S1406). The concrete process details of S1402 to S1406 are the same as those of the above S1002 to S1006.

After that, the buffer tank 34 is depressurized until the pressure inside reaches the set value (S1408), then vacuum wiping is performed by moving the vacuum wiper 172*c* in the forward direction with the vacuum wiper 172*c* in contact with the ejection opening surface 8*a* (S1410). The concrete process details of S1408 and S1410 are the same as those of the above S1010 and S1012, respectively.

Next, variable n representing a serial number of each of the printing element substrates 80*a* is set to "1" (S1412), and it is determined whether vacuum wiping has been finished for the n-th printing element substrate 80*a* (S1414). Here, the serial numbers are assigned to the multiple printing element substrates 80*a* on the ejection opening surface 8*a* sequentially from the one end side on which the suction preparation surface Bab is positioned. Each of these serial numbers is associated with the positional information on the corresponding printing element substrate 80*a*. Based on this positional information, it can be determined whether vacuum wiping has been finished for a printing element substrate 80*a* with the moving speed of the carriage 172*b* and the like taken into account.

Thus, at S1414, the print controller 202 makes determination based on the positional information associated with the serial number "n" and the detection results of the rotary encoder 30. Specifically, if it is determined that the carriage 172*b* has passed the position based on the positional information associated with the n-th printing element substrate 80*a*, it is determined that vacuum wiping for the n-th printing element substrate 80*a* has been finished. If it is determined that the carriage 172*b* has not passed the position based on the positional information associated with the n-th printing element substrate 80*a*, it is determined that vacuum wiping for the n-th printing element substrate 80*a* has not been finished.

If it is determined at S1414 that vacuum wiping for the n-th printing element substrate 80*a* has been finished, preliminary ejection starts for the n-th printing element substrate 80*a* (S1416). Specifically, at S1416, the print controller 202, via the head I/F 206, performs preliminary ejection from the ejection openings in the n-th printing element substrate 80*a*. As described above, in the present embodiment, the print controller 202 (and the head I/F 206) functions as a control unit that controls printing performed by the print head 8. Note that in the preliminary ejection, once it starts, a specified number of ejections are continuously performed at constant intervals. This preliminary ejection is executed until it is determined at S1418 described later that vacuum wiping for all the printing element substrates 80*a* has been finished or until it is determined at S1422 described later that the carriage 172*b* has moved to the vacuum-wiping end position. The ink ejected in preliminary ejection is received by the ink receiver 38.

After that, it is determined whether vacuum wiping for all the printing element substrates 80*a* has been finished (S1418). Specifically, it is determined at S1418 whether vacuum wiping for the printing element substrate 80*a* to which the last serial number "m" is assigned has been finished. If it is determined at S1418 that vacuum wiping for all the printing element substrates 80*a* has not been finished, n is incremented (S1420), and the process returns to S1414. If it is determined at S1418 that vacuum wiping for all the printing element substrates 80*a* has been finished, it is determined whether the carriage 172*b* has moved to the vacuum-wiping end position (S1422).

If it is determined at S1422 that the carriage 172*b* has moved to the vacuum-wiping end position, the preliminary ejection is finished and driving of the suction pump 32 is stopped (S1424), and this third vacuum wiping process ends. Specifically, at S1424, the print controller 202 finishes the preliminary ejection for the printing element substrates 80*a*. In addition, the print controller 202 stops driving the suction pump 32. Note that the preliminary ejection may be finished in the case where it is determined at S1418 that vacuum wiping for all the printing element substrates 80*a* is finished.

When the third vacuum wiping process ends as above, the print head 8 is made to retreat vertically upward, and at the timing when the vacuum wiper 172*c* is apart from the ejection opening surface 8*a*, the carriage 172*b* is moved to the vacuum-wiping start position.

As has been described above, in the printing apparatus 1, ink is not circulated in vacuum wiping. Instead, preliminary ejection is performed in vacuum wiping for the ejections openings for which vacuum wiping has been finished, on a print-element-substrate basis. With this operation, the printing apparatus 1 according to the present embodiment provides the same advantageous effects as the printing apparatus 1 according to the first embodiment.

Other Embodiments

Note that the above embodiments may be modified as shown in the following (1) to (7).

(1) Although in the above first embodiment, when vacuum wiping starts, ink circulation starts for the printing element substrates 80*a*, the present disclosure is not limited to this operation. Specifically, for example, in a configuration in which ink circulation can be controlled separately for each of the printing element substrates 80*a*, ink circulation may start sequentially from the printing element substrate 80*a* the ejection openings of which vacuum wiping has been finished for. Separate ink circulation for each printing element substrate 80*a* may be implemented, for example, by providing a structure that enables IN flow paths associated with the respective printing element substrates 80*a* to be selectively opened or closed.

(2) In the above first embodiment, ink is circulated in the circulation routes for all inks in the vacuum wiping process. In the above second embodiment, ink is circulated in the circulation route for a specified ink in the vacuum wiping process. However, the method of circulating ink is not limited to these operations. Specifically, in an embodiment, the operation executed in the vacuum wiping process can be switched as appropriate between the operation for circulating ink in the circulation routes for all the inks and the operation for circulating ink in the circulation route for a specified ink.

(3) Although in the above third embodiment, preliminary ejection is performed for the ejection openings for which vacuum wiping has been finished, on a printing element substrate 80*a* basis, the present disclosure is not limited to this operation. Specifically, preliminary ejection may be performed at all the printing element substrates 80*a* during vacuum wiping, or alternatively, preliminary ejection may be performed for each ejection opening for which vacuum wiping has been finished. In addition, the printing apparatus 1 in the above third embodiment may be configured not to include a circulation mechanism.

(4) Although in the above embodiment, the vacuum wiper 172*c* is moved relative to the ejection opening surface 8*a* in vacuum wiping. In addition, the wiping unit 17 is pulled out of the maintenance unit 16, and the print head 8 is moved to the wiping position to bring the vacuum wiper 172*c* into contact with the ejection opening surface 8*a*. However, the relationship between the movements of the print head 8 and the vacuum wiper 172*c* is not limited to these operations. In other words, any configuration may be used as long as the print head 8 and the vacuum wiper 172*c* can be moved relative to each other. In the case where the vacuum wiper 172*c* is capable of applying enough suction force to the ejection opening surface 8*a* without being in contact with it, the vacuum wiper 172*c* may perform suction with a space between the vacuum wiper 172*c* and the ejection opening surface 8*a*.

(5) Although in the above embodiments, the printing apparatus 1 performs printing onto conveyed print media, the present disclosure is not limited to this configuration. Specifically, the printing apparatus 1 may have a configuration in which printing is performed by ejecting ink from the print head onto a print medium placed at a specified position. Although in the above embodiment, vacuum wiping is performed only while the vacuum wiper 172*c* is moving in the forward direction, the present disclosure is not limited to this operation. Specifically, vacuum wiping may be performed only while the vacuum wiper 172*c* is moving in the backward direction or while it is moving both in the forward direction and in the backward direction.

(6) Although in the above second embodiment, ink is circulated only in the flow path in which the black ink circulates, of the multiple flow paths in which the different colored inks circulate, the present disclosure is not limited to this operation. Specifically, in the case where there are multiple flow paths each for circulating ink in which the degree of increase in viscosity due to the evaporation of the ink component is higher than a specified degree under specified conditions, the ink may be circulated in these multiple flow paths.

(7) Although in the above second embodiment, ink is circulated in the flow path in which ink that easily thickens circulates, of the multiple flow paths, the present disclosure is not limited to this operation. For example, Japanese Patent Laid-Open No. 2018-16046 discloses a technique in which the diameters of the ejection openings are set differently based on the brightness of each ink to suppress the granularity of print images. In the case where the diameter of the ejection openings is small, the ejection performance of the ejection openings is prone to decrease due to ink thickening or other factors. Hence, in a configuration including a print head having ejection openings with different diameters, ink may be circulated in vacuum wiping at least in the flow path from which ink is ejected through the ejection openings with a diameter smaller than a specified one.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-189855 filed Oct. 5, 2018, which is hereby incorporated by reference herein in its entirety.

What is claimed is:

1. An inkjet printing apparatus comprising:

a printing unit that includes arrayed multiple ejection openings configured to eject liquid and multiple flow paths each of which is communicating with the ejection opening, and that is configured to perform a printing process for printing an image on a print medium according to print data;

a discharge unit configured to perform a discharge process for discharging liquid from the ejection openings, wherein the discharge process is different from the printing process; and a circulation unit configured to circulate liquid supplied to the printing unit, through the flow paths;

wherein while the discharge process is performed by the discharge unit, the circulation unit circulates liquid in at least one of the flow paths.

2. The inkjet printing apparatus according to claim 1, further comprising:

a supply flow path for supplying liquid from a liquid storing unit to the print head; and a collection flow path for collecting the liquid from the print head to the liquid storing unit;

wherein the circulation unit circulates liquid in a circulation path including the supply flow path, the flow path, and the collection flow path.

3. The inkjet printing apparatus according to claim 1, wherein the printing unit includes arrayed multiple ejection openings for each of multiple kinds of liquids and multiple flow paths respectively communicating with the ejection openings, wherein the circulation unit is capable of circulating liquid in the flow paths provided for each of the multiple kinds of liquids, and wherein the circulation unit circulates liquid in at least one flow path of the multiple flow paths while the discharge process is performed by the discharge unit.

4. The inkjet printing apparatus according to claim 3, wherein the flow path in which liquid is circulated is a flow path for a liquid in which the degree of increase in viscosity due to evaporation of a liquid component in the liquid under a specified condition is higher than or equal to a specified degree.

5. The inkjet printing apparatus according to claim 3, wherein the circulation unit circulates liquid in at least one kind of flow paths while the discharge process is performed by the discharge unit.

6. The inkjet printing apparatus according to claim 3, wherein the flow paths of all the ejection openings for ejecting liquid of the same color are communicated with each other.

7. The inkjet printing apparatus according to claim 1, wherein the ejection openings of the printing unit include ejection openings with a specified diameter, and ejection openings with a diameter smaller than the specified diameter, and wherein the circulation unit circulates liquid in the flow paths communicating with the ejection openings with the diameter smaller than the specified diameter.

8. The inkjet printing apparatus according to claim 1, wherein the circulation unit circulates liquid such that the liquid passes through the flow paths communicating with all the ejection openings of the printing unit while the discharge unit performs the discharge process.

9. The inkjet printing apparatus according to claim 1, wherein the discharge unit sucks the liquid, wherein the discharge process is a process in which the discharge unit sucks the liquid from the ejection openings.

10. The inkjet printing apparatus according to claim 1, comprising a conveyance unit configured to convey the print medium in first direction, wherein the multiple ejection openings are arrayed in a direction intersecting the first direction by a length corresponding to a width of the print medium.

11. The inkjet printing apparatus according to claim 1, wherein the printing unit includes a printing element configured to eject liquid from the ejection opening in performing the printing process, and the discharge unit is different from the printing element.

12. The inkjet printing apparatus according to claim 11, wherein the discharge unit is a unit provided outside a print head.

13. The inkjet printing apparatus according to claim 1, wherein the discharge process is from a start to an end of a liquid discharge from the multiple ejection openings.

14. The inkjet printing apparatus according to claim 1, the discharge unit performs the discharge process by causing the multiple ejection openings to discharge liquid sequentially while moving relative to the printing unit.

15. The inkjet printing apparatus according to claim 1, wherein during the discharge process, the circulation unit circulates liquid in at least the flow paths communicating with the ejection openings for which the discharge by the discharge unit has been finished while the discharge unit discharges liquid from the ejection openings for which the discharge by the discharge unit has not been finished.

16. The inkjet printing apparatus according to claim 1, comprising a detection unit configured to detect the relative position between the print head and the suction unit, and a control unit determines the discharge process by the discharge unit has been finished, based on the position detected by the detection unit, and performs the preliminary ejection from the ejection openings for which the control unit has determined that the discharge process has been finished.

17. An inkjet printing apparatus comprising:

a printing unit that includes arrayed multiple ejection openings configured to eject liquid and that is configured to perform a printing process for printing an image according to print data, a discharge unit configured to perform a discharge process for discharging liquid from the ejection openings, wherein the discharge process is different from the printing process; and wherein while the discharge process is performed by the discharge unit, the printing unit performs preliminary ejection, which is liquid ejection different from ejection of the printing process.

18. The inkjet printing apparatus according to claim 17, wherein the printing unit includes multiple substrates disposed side by side, each substrate including an array of the ejection openings, and wherein the printing unit performs the preliminary ejection for the ejection openings on a substrate by substrate basis.

19. The inkjet printing apparatus according to claim 17, wherein during the discharge process, the printing unit performs preliminary ejection from at least the ejection openings for which the discharge by the discharge unit has been finished while the discharge unit discharges liquid from the ejection openings for which the discharge by the discharge unit has not been finished.

20. The inkjet printing apparatus according to claim 17, wherein the printing unit includes arrayed multiple ejection openings for each of multiple kinds of liquids and multiple flow paths respectively communicating with the ejection openings, wherein the circulation unit is capable of circulating liquid in the flow paths provided for each of the multiple kinds of liquids, and wherein the circulation unit circulates liquid in at least one flow path of the multiple flow paths while the discharge process is performed by the discharge unit.

21. The inkjet printing apparatus according to claim 17, comprising a conveyance unit configured to convey the print medium in first direction, wherein the multiple ejection openings are arrayed in a direction intersecting the first direction by a length corresponding to a width of the print medium.

22. The inkjet printing apparatus according to claim 17, wherein the printing unit includes a printing element configured to eject liquid from the ejection opening in performing the printing process, and the discharge unit is different from the printing element.

23. The inkjet printing apparatus according to claim 22, wherein the discharge unit is a unit provided outside a print head.

24. The inkjet printing apparatus according to claim 17, the discharge process is from a start to an end of a liquid discharge from the multiple ejection openings.

25. The inkjet printing apparatus according to claim 17, the discharge unit performs the discharge process by causing the multiple ejection openings to discharge liquid sequentially while moving relative to the printing unit.

26. A recovery method comprising:

moving at least one of a discharge unit and a printing unit relatively with respect to the other, the printing unit including arrayed multiple ejection openings configured to perform a printing process for ejecting liquid according to print data, the discharge unit being at a position facing an ejection opening surface of the printing unit, on which surface the ejection openings are formed; and discharging liquid from the ejection openings in order with the discharge unit, wherein the discharging liquid is different from the printing process, wherein while the discharge is performed for the ejection openings with the discharge unit, liquid is circulated in at least one flow path of the printing unit.

27. The recovery method according to claim 26, wherein a liquid supplied to the print head configured to eject multiple kinds of liquids from different ejection openings of the ejection openings, the ejection opening for each of the multiple kinds of liquids having a different flow path, is circulated such that the liquid passes through at least one flow path of the flow paths respectively provided for the multiple kinds of liquids.

28. The recovery method according to claim 27, wherein the flow path is a flow path for a liquid in which the degree of increase in viscosity due to evaporation of a liquid component in the liquid under a specified condition is higher than or equal to a specified degree.

29. The recovery method according to claim 26, wherein in a case where the discharge unit has finished discharge for some of the ejection openings, a circulation unit circulates liquid such that the liquid passes through the flow paths communicating with all the ejection openings of the print head.

30. A recovery method comprising:

moving at least one of a discharge unit and a printing unit relatively with respect to the other, the printing unit including arrayed multiple ejection openings and being configured to perform a printing process for ejecting liquid according to print data, the discharge unit being at a position facing an ejection opening surface of the printing unit, on which the ejection openings are formed; and discharging liquid from the ejection openings in order with the discharge unit, wherein the discharging liquid is different from the printing process, wherein while the discharge is performed for the ejection openings with the discharge unit, preliminary ejection, which is liquid ejection different from ejection of the printing process is performed from the printing unit.

31. An inkjet printing apparatus comprising:

a printing unit that includes arrayed multiple ejection openings configured to eject liquid, and that is configured to perform a printing process for printing an image on a print medium according to print data;

multiple flow paths, each of which has a first path for flowing the liquid from the outside of the printing unit to the inside of the printing unit and a second path for flowing the liquid from the inside of the printing unit to the outside of the printing unit;

a discharge unit configured to perform a discharge process for discharging liquid from the ejection openings, wherein the discharge process is different from the printing process; and a circulation unit configured to circulate liquid supplied to the printing unit, through the flow paths;

wherein while the discharge process is performed by the discharge unit, the control unit circulates liquid in at least one of the flow paths.

32. The inkjet printing apparatus according to claim 31, wherein the printing unit includes arrayed multiple ejection openings for each of multiple kinds of liquids, wherein the multiple flow paths are provided for each kind of liquid, wherein the circulation unit is capable of circulating liquid in the flow paths provided for each of the multiple kinds of liquids, and wherein the control unit makes the circulation unit circulate liquid in at least one flow path of the multiple flow paths during the discharge process.

33. The inkjet printing apparatus according to claim 31, wherein the first path is for supplying liquid from the liquid storage unit to the printing unit, wherein the second path is for collecting liquid from the printing unit to the liquid storage unit, wherein the inkjet printing apparatus further comprises:

a supply flow path for supplying liquid from a liquid storing unit to the print head; and a collection flow path for collecting the liquid from the print head to the liquid storing unit, and wherein the circulation unit circulates liquid in a circulation path including the supply flow path, the flow path, and the collection flow path.

34. The inkjet printing apparatus according to claim 31, wherein the printing unit includes arrayed multiple ejection openings for each of multiple kinds of liquids and multiple flow paths respectively communicating with the ejection openings, wherein the circulation unit is capable of circulating liquid in the flow paths provided for each of the multiple kinds of liquids, and wherein the circulation unit circulates liquid in at least one flow path of the multiple flow paths while the discharge process is performed by the discharge unit.

35. The inkjet printing apparatus according to claim 34, wherein the flow path in which liquid is circulated is a flow path for a liquid in which the degree of increase in viscosity due to evaporation of a liquid component in the liquid under a specified condition is higher than or equal to a specified degree.

36. The inkjet printing apparatus according to claim 34, wherein the circulation unit circulates liquid in at least one kind of flow paths while the discharge process is performed by the discharge unit.

37. The inkjet printing apparatus according to claim 34, wherein the flow paths of all the ejection openings for ejecting liquid of the same color are communicated with each other.

38. The inkjet printing apparatus according to claim 31, wherein the discharge unit sucks the liquid, wherein the discharge process is a process in which the discharge unit sucks the liquid from the ejection openings.

39. The inkjet printing apparatus according to claim 31, comprising a conveyance unit configured to convey the print medium in first direction, wherein the multiple ejection openings are arrayed in a direction intersecting the first direction by a length corresponding to a width of the print medium.

40. The inkjet printing apparatus according to claim 31, wherein the printing unit includes a printing element configured to eject liquid from the ejection opening in performing the printing process, and the discharge unit is different from the printing element.

41. The inkjet printing apparatus according to claim 40, wherein the discharge unit is a unit provided outside a print head.

42. The inkjet printing apparatus according to claim 31, the discharge process is from a start to an end of a liquid discharge from the multiple ejection openings.

43. The inkjet printing apparatus according to claim 31, the discharge unit performs the discharge process by causing the multiple ejection openings to discharge liquid sequentially while moving relative to the printing unit.

44. The inkjet printing apparatus according to claim 31, wherein during the discharge process, the circulation unit circulates liquid in at least the flow paths communicating with the ejection openings for which the discharge by the discharge unit has been finished while the discharge unit discharges liquid from the ejection openings for which the discharge by the discharge unit has not been finished.

45. The inkjet printing apparatus according to claim 31, comprising a detection unit configured to detect the relative position between the print head and the suction unit, and a control unit determines the discharge process by the discharge unit has been finished, based on the position detected by the detection unit, and performs the preliminary ejection from the ejection openings for which the control unit has determined that the discharge process has been finished.

46. An inkjet printing apparatus comprising:

a printing unit that includes arrayed multiple ejection openings configured to eject liquid, and that is configured to perform a printing process for printing an image on a print medium according to print data;

multiple flow paths, each of which has a first path for flowing the liquid from the outside of the printing unit to the inside of the printing unit and a second path for flowing the liquid from the inside of the printing unit to the outside of the printing unit;

a discharge unit configured to perform a discharge process for discharging liquid from the ejection openings, wherein the discharge process is different from the printing process; and wherein while the discharge process is performed by the discharge unit, the printing unit performs preliminary ejection, which is liquid ejection different from ejection of the printing process.

47. The inkjet printing apparatus according to claim 46, wherein the printing unit includes arrayed multiple ejection openings for each of multiple kinds of liquids, wherein the multiple flow paths are provided for each kind of liquid, wherein the circulation unit is capable of circulating liquid in the flow paths provided for each of the multiple kinds of liquids, and wherein the circulation unit circulates liquid in at least one flow path of the multiple flow paths during the discharge process.

48. The inkjet printing apparatus according to claim 47, wherein the first path is for supplying liquid from the liquid storage unit to the printing unit, and wherein the second path is for collecting liquid from the printing unit to the liquid storage unit.

49. The inkjet printing apparatus according to claim 46, comprising a conveyance unit configured to convey the print medium in first direction, wherein the multiple ejection openings are arrayed in a direction intersecting the first direction by a length corresponding to a width of the print medium.

50. The inkjet printing apparatus according to claim 46, wherein the printing unit includes a printing element configured to eject liquid from the ejection opening in performing the printing process, and the discharge unit is different from the printing element.

51. The inkjet printing apparatus according to claim 50, wherein the discharge unit is a unit provided outside a print head.

52. The inkjet printing apparatus according to claim 46, the discharge process is from a start to an end of a liquid discharge from the multiple ejection openings.

53. The inkjet printing apparatus according to claim 46, the discharge unit performs the discharge process by causing the multiple ejection openings to discharge liquid sequentially while moving relative to the printing unit.

54. The inkjet printing apparatus according to claim 46, wherein during the discharge process, the printing unit performs preliminary ejection from at least the ejection openings for which the discharge by the discharge unit has been finished while the discharge unit discharges liquid from the ejection openings for which the discharge by the discharge unit has not been finished.

55. A recovery method comprising:

moving at least one of a discharge unit and a printing unit relatively with respect to the other, the printing unit including arrayed multiple ejection openings configured to perform a printing process for ejecting liquid according to print data, the discharge unit being at a position facing an ejection opening surface of the printing unit, on which surface the ejection openings are formed, multiple flow paths having a first path for flowing the liquid from the outside of the printing unit to the inside of the printing unit and a second path for flowing the liquid from the inside of the printing unit to the outside of the printing unit; and discharging liquid from the ejection openings in order with the discharge unit, wherein the discharging liquid is different from the printing process, wherein while the discharge is performed for the ejection openings with the discharge unit, liquid is circulated in at least one of the flow paths.

56. The recovery method according to claim 55, wherein the flow path is a flow path for a liquid in which the degree of increase in viscosity due to evaporation of a liquid component in the liquid under a specified condition is higher than or equal to a specified degree.

57. A recovery method comprising:

moving at least one of a discharge unit and a printing unit relatively with respect to the other, the printing unit including arrayed multiple ejection openings and being configured to perform a printing process for ejecting liquid according to print data, the discharge unit being at a position facing an ejection opening surface of the printing unit, on which the ejection openings are formed, multiple flow paths having a first path for flowing the liquid from the outside of the printing unit to the inside of the printing unit and a second path for flowing the liquid from the inside of the printing unit to the outside of the printing unit; and discharging liquid from the ejection openings in order with the discharge unit, wherein the discharging liquid is different from the printing process, wherein while the discharge is performed for the ejection openings with the discharge unit, preliminary ejection, which is liquid ejection different from ejection of the printing process is performed from the printing unit.

* * * * *